United States Patent
Ding

(10) Patent No.: US 11,233,666 B2
(45) Date of Patent: Jan. 25, 2022

(54) POLICY CONTROL METHOD, NETWORK ELEMENT, AND SYSTEM

(71) Applicant: Huawei Technologies Co., Ltd., Shenzhen (CN)

(72) Inventor: Hui Ding, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/922,717

(22) Filed: Jul. 7, 2020

(65) Prior Publication Data

US 2020/0336321 A1    Oct. 22, 2020

Related U.S. Application Data

(63) Continuation of application No. PCT/CN2019/077418, filed on Mar. 8, 2019.

(30) Foreign Application Priority Data

Mar. 30, 2018 (CN) .......................... 201810288548.9

(51) Int. Cl.
*H04L 12/14* (2006.01)
*H04L 12/24* (2006.01)
*H04W 4/24* (2018.01)

(52) U.S. Cl.
CPC ........ *H04L 12/1407* (2013.01); *H04L 12/141* (2013.01); *H04L 41/0893* (2013.01); *H04W 4/24* (2013.01)

(58) Field of Classification Search
CPC ... H04L 12/14; H04L 12/141; H04L 12/1403; H04L 12/1407; H04L 41/0893;
(Continued)

(56) References Cited

U.S. PATENT DOCUMENTS

2010/0142373 A1   6/2010   Jin et al.
2012/0124229 A1   5/2012   Sahu et al.
(Continued)

FOREIGN PATENT DOCUMENTS

CN    102246547 A    11/2011
CN    102625272 A    8/2012
(Continued)

OTHER PUBLICATIONS

3GPP TS 23.203 V15.2.0 (Mar. 2018), 3rd Generation Partnership Project; Technical Specification Group Services and System Aspects; Policy and charging control architecture (Release 15), dated Mar. 27, 2018, hereinafter 3GPPTS2 (Year: 2018).*
(Continued)

*Primary Examiner* — Ronald Eisner
(74) *Attorney, Agent, or Firm* — Conley Rose, P.C.

(57) ABSTRACT

A policy control method performed by an enforcement function network element, where the enforcement function network element receives an update request to modify or remove a target packet flow description (PFD) associated with a target application identifier. For a session for which a first policy rule including the target application identifier is installed or activated, the enforcement function network element determines that data about an application corresponding to the target application identifier has been detected using the target PFD. The enforcement function network element further determines that start indication information of the application has been reported to a control function network element, and sends stop indication information of the application to the control function network element, which adjusts the first policy rule.

20 Claims, 10 Drawing Sheets

(58) Field of Classification Search
CPC ...... H04M 15/00; H04M 15/66; H04M 15/60; H04M 15/852; H04W 4/24
See application file for complete search history.

(56) References Cited

U.S. PATENT DOCUMENTS

| | | |
|---|---|---|
| 2017/0188260 A1 | 6/2017 | Zhou et al. |
| 2017/0201629 A1 | 7/2017 | Li et al. |

FOREIGN PATENT DOCUMENTS

| | | | |
|---|---|---|---|
| CN | 106211117 | A | 12/2016 |
| CN | 108064032 | A | 5/2018 |
| KR | 20130086637 | A | 8/2013 |
| KR | 20170023179 | A | 3/2017 |
| KR | 20170042339 | A | 4/2017 |
| WO | 2016173364 | A1 | 11/2016 |
| WO | 2017125698 | A1 | 7/2017 |
| WO | 2018082707 | A1 | 5/2018 |

OTHER PUBLICATIONS

Ericsson et al.: "Management of PFDs to PCEF/TDF", 3GPP Draft; 23203_CR1036R7_SDCI_(REL-14)_S2-165039 was 4724 SDCI_23203 Management of PFD_V4, vol. SA WG2, No. Sanya, China, Sep. 16, 2016, XP051679628, hereinafter "Management of PFDs to PCEF/TDF" (Year: 2016).*

S2-165039, Ericsson, et al.,"Management of PFDs to PCEF/TDF", 3GPP TSG SA WG2 Meeting #116bis, Aug. 28-Sep. 2, 2016, Sanya, China, 8 pages.

3GPP TS 23.203 V15.2 0 (Mar. 2018), "3rd Generation Partnership Project;Technical Specification Group Services and System Aspects; Policy and charging control architecture (Release 15)," Mar. 27, 2018, 261 pages.

3GPP TS 29.244 V15.1.0 (Mar. 2018), 3rd Generation Partnership Project; Technical Specification Group Core Network and Terminals; Interface between the Control Plane and the User Plane Nodes; Stage 3 (Release 15), Mar. 27, 2018, 170 pages.

3GPP TS 23.501 V15.1.0 (Mar. 2018), "3rd Generation Partnership Project; Technical Specification Group Services and System Aspects; System Architecture for the 5G System; Stage 2(Release 15)," Mar. 28, 2018, 201 pages.

Huawei, et al., "Application detection report when the PFDs are removed," 3GPP TSG-SA2 Meeting #127bis, S2-185292, May 28-Jun. 1, 2018, Newport Beach, USA, 5 pages.

* cited by examiner

POLICY CONTROL METHOD, NETWORK ELEMENT, AND SYSTEM

CROSS-REFERENCE TO RELATED APPLICATIONS

This application is a continuation of International Patent Application No. PCT/CN2019/077418, filed on Mar. 8, 2019, which claims priority to Chinese Patent Application No. 201810288548.9, filed on Mar. 30, 2018. The disclosures of the aforementioned applications are hereby incorporated by reference in their entirety.

TECHNICAL FIELD

This application relates to the field of communications technologies, and specifically, to a policy control method, an enforcement function network element, a control function network element, and a system.

BACKGROUND

During access of a terminal device to a network, a network-side control function network element such as a policy and charging rules function (PCRF) network element determines a policy rule for the terminal device based on information about the terminal device. The policy rule includes an application identifier (ID). After establishing a session connection to the network, the terminal device may use the established session to access an application corresponding to the application identifier. When the terminal device is accessing the application, an enforcement function network element such as a policy and charging enforcement function (PCEF) network element controls access of the terminal device to the application using the policy rule delivered by the PCRF, and generates data about the accessed application.

A packet flow description (PFD) list is configured for each application identifier on the PCEF. The PCEF uses a PFD in a PFD list corresponding to an application identifier to detect data about an application, and reports start indication information to the PCRF. The start indication information may be used by the PCRF to further determine whether to adjust the policy rule.

The PFD is usually managed by a third-party application, for example, a service capability server (SCS)/an application server (AS). The SCS/AS configures a new PFD for the PCEF using a service capability exposure function (SCEF) network element and a packet flow description function (PFDF) network element, or modifies or removes a PFD configured on the PCEF. However, the PCRF does not adjust the policy rule based on an actual status of the PFD, and consequently a policy of the third-party application does not match a policy of an operator.

SUMMARY

Embodiments of this application provide a policy control method, a network element, and a system, such that a policy of a third-party application matches a policy of an operator.

To achieve the foregoing objective, the following technical solutions are provided in the embodiments of this application.

A first aspect of this application provides a policy control method. The method may be applied to a $4^{th}$ Generation (4G) network, a 4.5G network, or a $5^{th}$ Generation (5G) network. An enforcement function network element and a control function network element are used during execution of the policy control method. The enforcement function network element and the control function network element correspond to different function entities in the 4G network, the 4.5G network, or the 5G network. The method includes: receiving, by the enforcement function network element, an update request, where the update request instructs the enforcement function network element to modify or remove a target PFD, and the target PFD is associated with a target application identifier; and specific to a session for which a first policy rule including the target application identifier is installed or activated, sending, by the enforcement function network element, first indication information or second indication information to the control function network element if the enforcement function network element has detected data about an application corresponding to the target application identifier using the target PFD and the enforcement function network element has reported start indication information of the application to the control function network element, where the first indication information is stop indication information of the application, and the second indication information is indication information that the target PFD has been removed or modified. Optionally, the first indication information or the second indication information may instruct the control function network element to adjust the first policy rule. In this application, "associated" means that there is a correspondence between the target PFD and the target application identifier; and "has reported the start indication information of the application" means that the start indication information of the application has been reported. The update request may be a removal request or a modification request. When the update request is a removal request, the request is used to instruct to remove the target PFD. Alternatively, when the update request is a modification request, the request is used to instruct to modify the target PFD. In the solution in the first aspect, alternatively, both the first indication information and the second indication information may be reported. It can be learned from the first aspect that, after a PFD of the enforcement function network element has been removed or modified, the enforcement function network element notifies the control function network element in a timely manner, such that the control function network element adjusts a policy rule in a timely manner based on an actual status of the PFD of the enforcement function network element, and a policy of a third-party application matches a policy of an operator.

Optionally, with reference to the first aspect, in a first possible implementation, sending, by the enforcement function network element, first indication information or second indication information to the control function network element may include: sending, by the enforcement function network element, the first indication information or the second indication information to the control function network element if the target PFD is a last PFD that is used to detect the data about the application among a PFD associated with the target application identifier. The first possible implementation of the first aspect indicates that the enforcement function network element sends the first indication information or the second indication information to the control function network element if the enforcement function network element has detected the data about the application corresponding to the target application identifier using the target PFD, the enforcement function network element has reported the start indication information of the application to the control function network element, and the target PFD is the last PFD that is used to detect the data about the application among the PFD associated with the target application identifier.

Optionally, with reference to the first aspect, in a second possible implementation, sending, by the enforcement function network element, first indication information or second indication information to the control function network element includes sending, by the enforcement function network element, the first indication information or the second indication information to the control function network element if the target PFD is a last PFD associated with the target application identifier or the target PFD is a last PFD that is associated with the target application identifier and that is provided by a packet flow description function network element. The second possible implementation of the first aspect indicates that the enforcement function network element sends the first indication information or the second indication information to the control function network element if the enforcement function network element has detected the data about the application corresponding to the target application identifier using the target PFD, the enforcement function network element has reported the start indication information of the application to the control function network element, and the target PFD is the last PFD associated with the target application identifier or the target PFD is the last PFD that is associated with the target application identifier and that is provided by the packet flow description function network element.

Optionally, with reference to the first aspect, or the first or the second possible implementation of the first aspect, in a third possible implementation, before receiving, by the enforcement function network element, an update request, the method further includes: detecting, by the enforcement function network element, the data about the application using the PFD associated with the target application identifier; and establishing a correspondence between the detected data about the application and the used PFD. Additionally, after receiving, by the enforcement function network element, an update request, the method may further include: determining, by the enforcement function network element based on the correspondence and the target PFD, whether there is data about the application corresponding to the target PFD; and if there is data about the application corresponding to the target PFD, determining that the data about the application corresponding to the target application identifier has been detected using the target PFD. In the third possible implementation of the first aspect, the data about the application that has been detected using the target PFD can be quickly determined based on the correspondence between the data about the application and the used PFD. This can accelerate reporting the first indication information or the second indication information.

Optionally, with reference to the first or the second possible implementation of the first aspect, in a fourth possible implementation, if the start indication information of the application includes an application start indication and the application identifier, the first indication information includes an application stop indication and the application identifier, and the second indication information includes the application identifier and the indication information that the target PFD has been removed or modified. If the start indication information of the application includes no service data flow description information, it indicates that reporting the start indication information is triggered when the data about the application, that is, a service data flow or an IP flow of the application, is detected using any PFD in a PFD list corresponding to the application identifier. In this case, the first indication information or the second indication information is reported only when the following condition is satisfied: The target PFD is the last PFD that is used to detect the data about the application, the target PFD is the last PFD associated with the target application identifier, or the target PFD is the last PFD that is associated with the target application identifier and that is provided by the packet flow description function network element.

Optionally, with reference to any one of the first aspect, or the first to the third possible implementations of the first aspect, in a fifth possible implementation, if the start indication information of the application includes an application start indication, the application identifier, service data flow description information, and a corresponding instance identifier, the first indication information includes an application stop indication, the application identifier, and the instance identifier, and the second indication information includes the application identifier, the indication information that the target PFD has been removed or modified, and the instance identifier. If the start indication information of the application includes the service data flow description information, it indicates that reporting the start indication information is triggered when a service data flow or an Internet Protocol (IP) flow of the application is detected using the target PFD. In this case, reporting the first indication information or the second indication information is triggered once the target PFD is removed.

Optionally, with reference to any one of the first aspect, or the first to the fifth possible implementations of the first aspect, in a sixth possible implementation, after receiving, by the enforcement function network element, an update request, the method further includes stopping enforcing, by the enforcement function network element, the first policy rule for the data about the application that is detected using the target PFD.

Optionally, after sending, by the enforcement function network element, first indication information or second indication information to the control function network element, the method further includes receiving, by the enforcement function network element, a second policy rule sent by the control function network element, where the second policy rule is used to control subsequent data about the application.

Optionally, with reference to any one of the first aspect, or the first to the sixth possible implementations of the first aspect, in a seventh possible implementation, when the enforcement function network element is a policy and charging enforcement function, the control function network element is a policy and rule function network element, When the enforcement function network element is a traffic detection function user-plane function network element, the control function network element is a traffic detection function control-plane function network element. When the enforcement function network element is a packet data network gateway user-plane function network element, the control function network element is a packet data network gateway control-plane function network element. When the enforcement function network element is a user-plane function network element, the control function network element is a session management function network element.

Optionally, with reference to the seventh possible implementation of the first aspect, in an eighth possible implementation, when the enforcement function network element is a policy and charging enforcement function network element and the control function network element is a policy and rule function network element, after the enforcement function network element reports the start indication information of the application to the control function network element, the method may further include. receiving, by the enforcement function network element, a third policy rule sent by the control function network element, where the third policy rule is used to perform policy control on the application corresponding to the target application identifier. Additionally, after sending, by the enforcement function network element, first indication information or second indication information to the control function network element, the method further include: receiving, by the enforcement function network element, removal instruction information sent by the control function network element for the third policy rule; and removing the third policy rule. In another case, when the enforcement function network element is a traffic detection function network element and the control function network element is a policy and rule function network element, after the traffic detection function network element reports the start indication information of the application to the policy and rule function network element, the policy and charging enforcement function network element receives a third policy rule sent by the control function network element, and performs, according to the third policy rule, policy control on the application corresponding to the target application identifier. Further, after the traffic detection function network element sends the first indication information or the second indication information to the policy and rule function network element, the policy and charging enforcement function network element receives removal instruction information sent by the control function network element for the third policy rule, and removes the third policy rule.

Optionally, with reference to the seventh possible implementation of the first aspect, in a ninth possible implementation, when the enforcement function network element is a packet data network gateway user-plane function network element and the control function network element is a packet data network gateway control-plane function network element. When the enforcement function network element is a user-plane function network element and the control function network element is a session management function network element, after the enforcement function network element reports the start indication information of the application to the control function network element, the method further includes receiving, by the enforcement function network element, a fourth policy rule and one or more other rules associated with the fourth policy rule that are sent by the control function network element, where the fourth policy rule and the associated one or more other rules are used to perform policy control on the application corresponding to the target application identifier. Additionally, after sending, by the enforcement function network element, first indication information or second indication information to the control function network element, the method further includes receiving, by the enforcement function network element, removal instruction information sent by the control function network element for the fourth policy rule and the one or more other rules associated with the fourth policy rule, and removing the fourth policy rule and the one or more other rules associated with the fourth policy rule.

A second aspect of this application provides a policy control method. The method may be applied to a 4G network, a 4.5G network, or a 5G network. An enforcement function network element and a control function network element are used during execution of the policy control method. The enforcement function network element and the control function network element correspond to different function entities in the 4G network, the 4.5G network, or the 5G network. The method may include: receiving, by the control function network element, indication information that a target PFD has been removed or modified and that is sent by the enforcement function network element, where the target PFD is associated with a target application identifier, and the indication information is used to indicate that the enforcement function network element has detected data about an application corresponding to the target application identifier using the target PFD, indicate that the enforcement function network element has reported start indication information of the application to the control function network element, and indicate that the target PFD has been modified or removed; and adjusting, by the control function network element, a first policy rule based on the indication information that the target PFD has been removed or modified. Optionally, the control function network element may further receive stop indication information of the application. It can be learned from the second aspect that, after a PFD of the enforcement function network element has been removed or modified, the enforcement function network element notifies the control function network element in a timely manner, such that the control function network element adjusts the policy rule in a timely manner based on an actual status of the PFD of the enforcement function network element, and a policy of a third-party application matches a policy of an operator.

With reference to the second aspect, in a first possible implementation, adjusting, by the control function network element, a first policy rule based on the indication information that the target PFD has been removed or modified includes determining, by the control function network element based on the indication information that the target PFD has been removed or modified, a second policy rule used to control subsequent data about the application. Correspondingly, the method further includes sending, by the control function network element, the second policy rule to the enforcement function network element, where the second policy rule is used by the enforcement function network element to control the subsequent data about the application.

With reference to the second aspect or the first possible implementation of the second aspect, in a second possible implementation, when the enforcement function network element is a policy and charging enforcement function and the control function network element is a policy and rule function network element, after the control function network element receives the start indication information reported by the enforcement function network element, the method further includes: determining, by the control function network element, a third policy rule based on the start indication information; and sending the third policy rule to the enforcement function network element. Additionally, after receiving, by the control function network element, indication information that a target PFD has been removed or modified and that is sent by the enforcement function network element, the method further includes sending, by the control function network element, removal instruction information for the third policy rule to the enforcement function network element, to instruct the enforcement function network element to remove the third policy rule. In another case, when the enforcement function network element is a traffic detection function network element and the control function network element is a policy and rule function network element, after the policy and rule function network element receives the start indication information reported by the traffic detection function network element, the policy and rule function network element determines a third policy rule based on the start indication information, and sends the third policy rule to the policy and charging enforcement function network element. Further, after the policy and rule function network element receives the indication information that the target PFD has been removed or modified and that is sent by the traffic detection function network element, the policy and rule function network element sends removal instruction information for the third policy rule to the policy and charging enforcement function network element, to instruct the policy and charging enforcement function network element to remove the third policy rule.

With reference to the second aspect or the first possible implementation of the second aspect, in a third possible implementation, when the enforcement function network element is a packet data network gateway user-plane function network element and the control function network element is a packet data network gateway control-plane function network element, or when the enforcement function network element is a user-plane function network element and the control function network element is a session management function network element, after the control function network element receives the start indication information reported by the enforcement function network element, the method further includes: determining, by the control function network element based on the start indication information, a fourth policy rule and one or more other rules associated with the fourth policy rule; and sending the fourth policy rule and the one or more other rules associated with the fourth policy rule to the enforcement function network element, Additionally, after receiving, by the control function network element, indication information that a target PFD has been removed or modified and that is sent by the enforcement function network element, the method further includes sending, by the control function network element, removal instruction information for the fourth policy rule and the one or more other rules associated with the fourth policy rule to the enforcement function network element, to instruct the enforcement function network element to remove the fourth policy rule and the one or more other rules associated with the fourth policy rule.

A third aspect of this application provides an enforcement function network element, where the enforcement function network element has a function of implementing the method according to any one of the first aspect or the possible implementations of the first aspect. The function may be implemented using hardware, or may be implemented by hardware executing corresponding software. The hardware or software includes one or more modules corresponding to the foregoing function.

A fourth aspect of this application provides a control function network element, where the control function network element has a function of implementing the method according to any one of the second aspect or the possible implementations of the second aspect. The function may be implemented using hardware, or may be implemented by hardware executing corresponding software. The hardware or software includes one or more modules corresponding to the foregoing function.

A fifth aspect of this application provides an enforcement function network element, including a processor and a memory. The memory is configured to store a computer executable instruction. When the enforcement function network element runs, the processor executes the computer executable instruction stored in the memory, such that the enforcement function network element performs the policy control method according to any one of the first aspect or the possible implementations of the first aspect.

A sixth aspect of this application provides a control function network element, including a processor and a memory. The memory is configured to store a computer executable instruction. When the control function network element runs, the processor executes the computer executable instruction stored in the memory, such that the control function network element performs the policy control method according to any one of the second aspect or the possible implementations of the second aspect.

A seventh aspect of this application provides a computer-readable storage medium. The computer-readable storage medium stores an instruction. When the instruction runs on a computer, the computer is enabled to perform the policy control method according to any one of the first aspect or the possible implementations of the first aspect.

An eighth aspect of this application provides a computer-readable storage medium. The computer-readable storage medium stores an instruction. When the instruction runs on a computer, the computer is enabled to perform the policy control method according to any one of the second aspect or the possible implementations of the second aspect.

A ninth aspect of this application provides a computer program product including an instruction. When the instruction runs on a computer, the computer is enabled to perform the policy control method according to any one of the first aspect or the possible implementations of the first aspect.

A tenth aspect of this application provides a computer program product including an instruction. When the instruction runs on a computer, the computer is enabled to perform the policy control method according to any one of the second aspect or the possible implementations of the second aspect.

An eleventh aspect of this application provides a chip system. The chip system includes a processor configured to support an enforcement function network element in implementing a function in any one of the first aspect or the possible implementations of the first aspect. In a possible design, the chip system further includes a memory, and the memory is configured to store a program instruction and data that are necessary for the enforcement function network element. The chip system may include a chip, or may include a chip and one or more other discrete devices.

A twelfth aspect of this application provides a chip system. The chip system includes a processor, configured to support a control function network element in implementing the function in any one of the second aspect or the possible implementations of the second aspect. In a possible design, the chip system further includes a memory, and the memory is configured to store a program instruction and data that are necessary for the control function network element. The chip system may include a chip, or may include a chip and one or more other discrete devices.

For technical effects brought by any implementation in the third aspect, the fifth aspect, the seventh aspect, the ninth aspect, and the eleventh aspect, refer to the technical effects brought by different implementations in the first aspect. Details are not described herein again.

For technical effects brought by any implementation in the fourth aspect, the sixth aspect, the eighth aspect, the tenth aspect, and the twelfth aspect, refer to the technical effects brought by different implementations in the second aspect. Details are not described herein again.

A thirteenth aspect of the embodiments of this application provides a policy control system, including an enforcement function network element and a control function network element. The enforcement function network element is the enforcement function network element described in any one of the first aspect or the possible implementations of the first aspect, and the control function network element is the control function network element described in any one of the second aspect or the possible implementations of the second aspect.

In the embodiments of this application, after a PFD of the enforcement function network element has been removed or modified, the enforcement function network element notifies the control function network element in a timely manner, such that the control function network element adjusts a policy rule in a timely manner based on an actual status of the PFD of the enforcement function network element, and a policy of a third-party application matches a policy of an operator.

DESCRIPTION OF EMBODIMENTS

Figure 1:
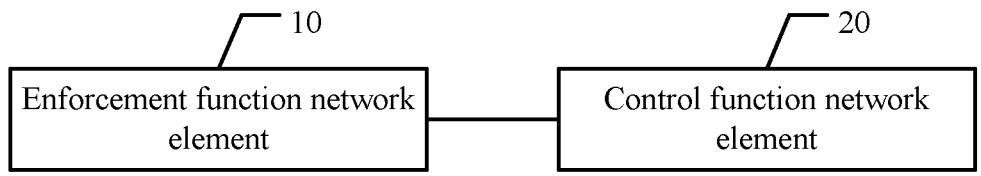
FIG. 1 is a schematic diagram of an embodiment of a policy control system according to an embodiment of this application.

The following describes the embodiments of this application with reference to the accompanying drawings. The described embodiments are merely some but not all of the embodiments of this application. A person of ordinary skill should understand that, with development of technologies and emergence of new scenarios, the technical solutions provided in the embodiments of this application are also applicable to similar technical issues.

The embodiments of this application provide a policy control method, a network element, and a system. After a PFD of an enforcement function network element has been removed or modified, the enforcement function network element may notify a control function network element in a timely manner, such that the control function network element adjusts a policy rule in a timely manner based on an actual status of the PFD of the enforcement function network element. The following separately provides detailed descriptions.

The term "and/or" in this application may describe an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

In the specification, claims, and accompanying drawings of this application, the terms such as "first" and "second" are intended to distinguish between similar objects but do not necessarily indicate a specific order or sequence. It should be understood that the data termed in such a way are interchangeable in proper circumstances, such that the embodiments described herein can be implemented in orders other than the order illustrated or described herein. Moreover, the terms "include", "contain" and any other variants mean to cover the non-exclusive inclusion. For example, a process, method, system, product, or device that includes a list of steps or modules is not necessarily limited to those expressly listed steps or modules, but may include other steps or modules not expressly listed or inherent to such a process, method, product, or device. Names or numbers of steps in this application do not mean that the steps in a method procedure need to be performed according to a chronological/logical order indicated by the names or numbers. An execution sequence of the steps in the procedure that have been named or numbered may be changed based on technical objectives to be implemented, provided that a same or similar technical effect can be achieved. The module division in this application is merely logical function division and may be other division in actual application. For example, a plurality of modules may be combined or integrated into another system, or some features may be ignored or not be performed. In addition, the displayed or discussed mutual couplings or direct couplings or communication connections may be implemented through some interfaces. The indirect couplings or communication connections between the modules may be implemented in electrical or other similar forms. This is not limited in this application. In addition, the modules or submodules described as separate parts may or may not be physically separate, may or may not be physical modules, or may be distributed in a plurality of circuit modules. Some or all of the modules may be selected depending on an actual requirement to achieve the objectives of the solutions in this application.

A user equipment in the embodiments of this application may include various handheld devices, in-vehicle devices, wearable devices, or computing devices that have a wireless communication function, or other processing devices connected to a wireless modem. The terminal may be a mobile station (MS), a subscriber unit, a cellular phone, a smartphone or smart phone, a wireless data card, a personal digital assistant (PDA) computer, a tablet computer, a wireless modem, a handheld device or handset, a laptop computer, a machine type communications (MTC) terminal, or the like.

There are a plurality of abbreviations in the embodiments of this application, and therefore full names corresponding to abbreviations in the embodiments of this application are first introduced in Table 1.

TABLE 1

Table of abbreviations

| Abbreviation | Full Name |
| --- | --- |
| 4G | fourth generation |
| 5G | fifth generation |
| ADC | application detection control |
| AF | application function |
| AMF | access and mobility management function |

TABLE 1-continued

Table of abbreviations

| Abbreviation | Full Name |
|---|---|
| AS | application server |
| BAR | buffer action rule |
| DN | data network |
| FAR | forwarding action rule |
| HSS | home subscriber server |
| IP | Internet Protocol |
| IP-CAN | IP connectivity access network |
| NEF | network exposure function |
| PCC | policy and charging control |
| PCEF | policy and charging enforcement function |
| PCF | policy control function |
| PCRF | policy and charging rule function |
| PDR | packet detection rule |
| PDU | protocol data unit |
| PFCP | Packet Flow Control Protocol |
| PFD | packet flow description |
| PFDF | packet flow description function |
| PGW | packet data network gateway |
| PGW-C | packet data network gateway-control |
| PGW-U | packet data network gateway-user |
| QER | QoS enforcement rule |
| QoS | quality of service |
| RAN | radio access network |
| SCEF | service capability exposure function |
| SCS | service capability server |
| SMF | session management function |
| SPR | subscription profile repository |
| TDF | traffic detection function |
| UDM | unified data management |
| UDR | unified data repository |
| UE | user equipment |
| UPF | user plane function |
| URL | Uniform Resource Locator |
| URR | usage report rule |

FIG. 1 is a schematic diagram of a policy control system according to an embodiment of this application.

As shown in FIG. 1, the policy control system provided in this embodiment of this application includes an enforcement function network element 10 and a control function network element 20.

The enforcement function network element 10 is configured to: receive an update request, where the update request is used to instruct to modify or remove a target PFD, and the target PFD is associated with a target application identifier; and specific to a session for which a first policy rule including the target application identifier is installed or activated, send first indication information or second indication information to the control function network element 20 if the enforcement function network element has detected data about an application corresponding to the target application identifier using the target PFD and the enforcement function network element has reported start indication information of the application to the control function network element 20. The first indication information is stop indication information of the application, and the second indication information is indication information that the target PFD has been removed or modified.

The control function network element 20 is configured to: receive the first indication information or the second indication information sent by the enforcement function network element 10; and adjust the first policy rule based on the first indication information or the second indication information.

Optionally, the first indication information or the second indication information may be used to instruct the control function network element 20 to adjust the first policy rule.

The update request may be a PFD removal request or a PFD modification request. On the enforcement function network element, a PFD may be maintained using a PFD list, and each PFD list corresponds to one application identifier. One application identifier may be associated with one or more PFDs. The target application identifier may be an identifier of one of a plurality of applications run by an operator or a third party. The target PFD may be one or more of a plurality of PFDs associated with the target application identifier.

The PFD may include a PFD identifier and PFD content. The PFD content includes a 3-tuple. The 3-tuple may include a protocol type, an IP address and a port number of a server side, and significant parts of a URL or a domain name.

The following provides an example. For a relationship between an application identifier and a PFD, refer to a PFD list in Table 2 for understanding.

TABLE 2

| PFD list for an application identifier 1 | |
|---|---|
| PFD identifier | PFD content |
| PFD ID1 | 3-tuple 1 |
| PFD ID2 | Significant parts of a URL |
| PFD ID3 | Domain name |
| PFD ID4 | 3-tuple 2 |

In Table 2, the application identifier 1 is associated with four PFDs whose identifiers are: PFD ID1, PFD ID2, PFD ID3, and PFD ID4. PFD content corresponding to the PFD ID1 is a 3-tuple 1, PFD content corresponding to the PFD ID2 is significant parts of a URL, PFD content corresponding to the PFD ID3 is a domain name, and PFD content corresponding to the PFD ID4 is a 3-tuple 2.

Certainly, Table 2 is merely an example for description, and should not be understood as a limitation on the PFD list.

In the example of Table 2, if the application identifier 1 is the target application identifier, the target PFD is one or more of the four PFDs in Table 2.

The session is established by the enforcement function network element when a UE accesses a network. The session may be an IP-CAN session, a TDF session, or a PDU session. After the session is established, the UE may use the session to access the application corresponding to the target application identifier. The enforcement function network element is configured to: use the first policy rule to control access of the UE to the application corresponding to the target application identifier; use one or more of the PFDs associated with the target application identifier to detect the data about the application corresponding to the target application identifier, where data about the application that is detected using one PFD is a service data flow or an IP flow; and report the start indication information of the application to the control function network element.

The start indication information of the application includes an application start indication and the target application identifier. If an IP 5-tuple of service data flow description information of the detected data about the application is stable, the start indication information of the application further includes the service data flow description information and an instance identifier.

In an implementation, the enforcement function network element 10 is further configured to: detect, before receiving the update request, the data about the application using the PFD associated with the target application identifier; and establish a correspondence between the detected data about the application and the used PFD. The enforcement function network element 10 further stores a correspondence between each piece of detected data about the application and a used PFD. After receiving the update request, the enforcement function network element may remove or modify the target PFD, and determine, based on the correspondence, whether the data about the application corresponding to the target application identifier has been detected using the target PFD. If the enforcement function network element determines that the data about the corresponding application has been detected using the target PFD, after the target PFD is modified or removed, the control function network element needs to adjust the first policy rule in a timely manner, such that a policy rule formulated by the control function network element is applicable to the enforcement function network element.

In the foregoing descriptions, the enforcement function network element reports the first indication information or the second indication information. Alternatively, the enforcement function network element may report both the first indication information and the second indication information.

Optionally, the enforcement function network element 10 is configured to: specific to the session for which the first policy rule including the target application identifier is installed or activated, send the first indication information or the second indication information to the control function network element if the enforcement function network element has detected the data about the application corresponding to the target application identifier using the target PFD, and has reported the start indication information of the application to the control function network element, and the target PFD is a last PFD that is used to detect the data about the application among a PFD associated with the target application identifier.

Optionally, the enforcement function network element 10 is configured to: specific to the session for which the first policy rule including the target application identifier is installed or activated, send the first indication information or the second indication information to the control function network element if the enforcement function network element has detected the data about the application corresponding to the target application identifier using the target PFD, and has reported the start indication information of the application to the control function network element, and the target PFD is a last PFD associated with the target application identifier or the target PFD is a last PFD that is associated with the target application identifier and that is provided by a packet flow description function network element.

If the start indication information of the application includes no service data flow description information, it indicates that reporting the start indication information is triggered when the data about the application is detected. That is, when a service data flow or an IP flow of the application is detected using any PFD in a PFD list corresponding to the application identifier. In this case, the first indication information or the second indication information is reported only when the following condition is satisfied: The target PFD is the last PFD that is used to detect the data about the application, the target PFD is the last PFD associated with the target application identifier, or the target PFD is the last PFD that is associated with the target application identifier and that is provided by the packet flow description function network element. If the start indication information of the application includes the service data flow description information, it indicates that reporting the start indication information is triggered when a service data flow or an IP flow of the application is detected using the target PFD. In this case, reporting the first indication information or the second indication information is triggered once the target PFD is removed.

Before the enforcement function network element receives the update request, if the start indication information of the application reported by the enforcement function network element to the control function network element includes the application start indication (app_start) and the application identifier, the first indication information includes an application stop indication and the application identifier when it is determined that the target PFD is the last PFD that is used to detect the data about the application among the PFD associated with the target application identifier, or that the target PFD is the last PFD associated with the target application identifier, or that the target PFD is the last PFD that is associated with the target application identifier and that is provided by the packet flow description function network element. The first indication information may further include the indication information that the target PFD has been removed or modified, and the second indication information includes the application identifier and the indication information that the target PFD has been removed or modified. Information that the target PFD has been removed may be PFD_removed or a PFD_removed indication. Information that the target PFD has been modified may be PFD_modified and content resulting from the modification.

Optionally, before the enforcement function network element receives the update request, if the start indication information of the application reported by the enforcement function network element to the control function network element includes the application start indication, the application identifier, the service data flow description information, and a corresponding instance identifier, the first indication information includes an application stop indication, the application identifier, and the instance identifier, and the second indication information includes the application stop indication, the application identifier, the indication information that the target PFD has been removed or modified, and the instance identifier.

Optionally, the enforcement function network element 10 is further configured to stop enforcing the first policy rule for the data about the application that is detected using the target PFD.

Optionally, after the control function network element 20 sends a second policy rule to the enforcement function network element 10, the enforcement function network element 10 is further configured to control subsequent data about the application using the second policy rule. The subsequent data is data about the application resulting from removal or modification of the target PFD.

In the policy control system described above, after a PFD of the enforcement function network element 10 has been removed or modified, the enforcement function network element 10 notifies the control function network element 20 in a timely manner, such that the control function network element 20 adjusts a policy rule in a timely manner based on an actual status of the PFD of the enforcement function network element, and a policy of a third-party application matches a policy of an operator.

The enforcement function network element and the control function network element in FIG. 1 may be located in a control plane/user plane (C/U)-not-separated architecture in a 4G network, a C/U-separated architecture in a 4G network, or a 5G network architecture. Certainly, the enforcement function network element and the control function network element may be located in another network architecture. Only the C/U-not-separated architecture in the 4G network, the C/U-separated architecture in the 4G network, and the 5G network architecture are used as examples for description in the embodiments of this application. C/U-not-separated means that a control plane function and a user plane function are not separate on a PGW/TDF. C/U-separated means that a control plane function and a user plane function are separate on a PGW/TDF.

In the C/U-not-separated architecture in the 4G network, when the enforcement function network element is a policy and charging enforcement function network element, the control function network element is a policy and rule function network element. In other words, when the enforcement function network element is a PCEF, the control function network element is a PCRF. Alternatively, when the enforcement function network element is a traffic detection function network element, the control function network element may be a policy and rule function network element. In other words, when the enforcement function network element is a TDF, the control function network element is a PCRF.

In the C/U-separated architecture in the 4G network, when the enforcement function network element is a packet data network gateway user-plane function network element, the control function network element is a packet data network gateway control-plane function network element. In other words, when the enforcement function network element is a PGW-U, the control function network element is a PGW-C. Alternatively, when the enforcement function network element is a traffic detection function user-plane function network element, the control function network element may be a traffic detection function control-plane function network element. In other words, when the enforcement function network element is a TDF-U, the control function network element is a TDF-C.

In the 5G network architecture, when the enforcement function network element is a user-plane function network element, the control function network element is a session management function network element. In other words, when the enforcement function network element is a UPF, the control function network element is an SMF.

Figure 2:
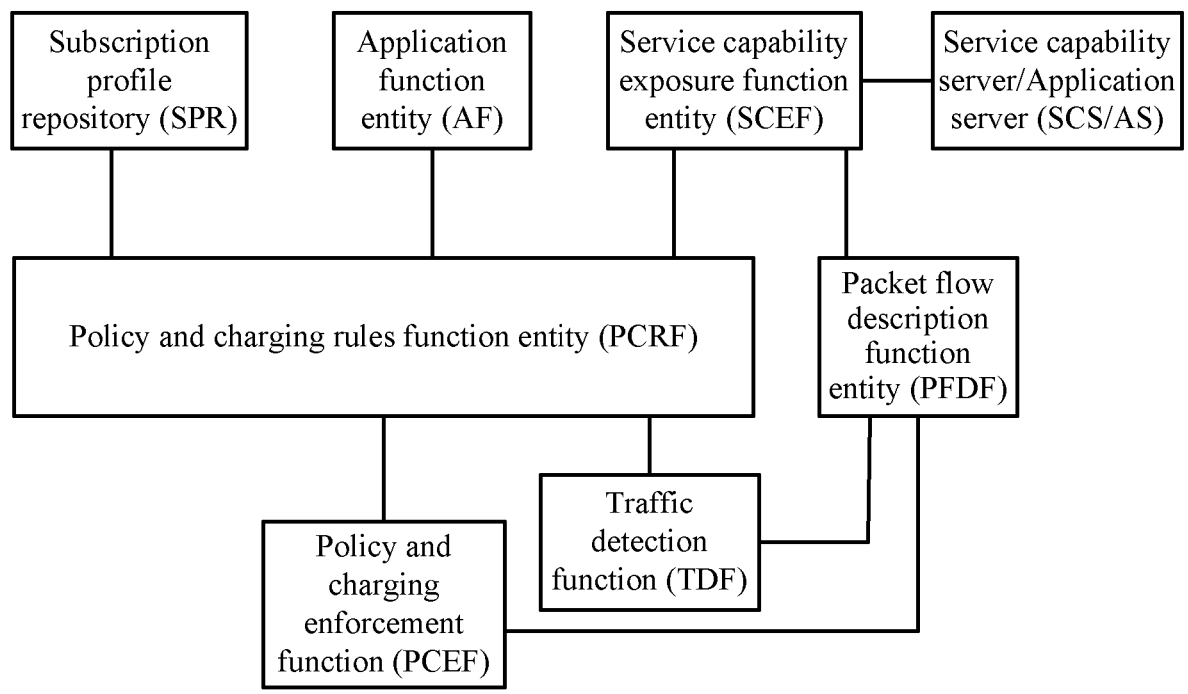
FIG. 2 is a schematic diagram of a C/U-not-separated architecture in a 4G network.

FIG. 2 is a schematic diagram of a C/U-not-separated architecture in a 4G network.

In the 4G network, the C/U-not-separated PCC architecture shown in FIG. 2 enables functions such as policy control, application detection and service awareness, charging control, usage monitoring, and traffic steering for user service access, and enables functions such as PFD management, QoS guarantee, data service sponsorship, and transmission policy negotiation for a third-party application.

In the architecture shown in FIG. 2, both a PCEF and a TDF may exist, or only a PCEF or a TDF may exist. In addition to the PCEF/TDF and a PCRF, optionally, an AF, an SCEF, a PFDF, an SPR, or an SCS/AS may be further included. The SPR stores user subscription information, the AF and the SCEF store application-layer information, and both the SCS/AS and the PFDF are configured to manage a PFD.

The PCRF may formulate a PCC/ADC rule based on at least one of the subscription information obtained from the SPR, the application-layer information obtained from the AF or the SCEF, access network information obtained from the PCEF, and an operator policy configured on the PCRF. The PCC/ADC rule includes an application identifier (Id) and another policy that is related to formulation of an IP-CAN session established for UE to access a network. The PCEF controls access of the UE to an application according to the PCC rule delivered by the PCRF, and the TDF controls access of the UE to the application according to the ADC rule delivered by the PCRF. In the 4G network architecture shown in FIG. 2, the PCEF is located in the PGW.

The SCS/AS manages, using the SCEF, the PFDF, and the PCRF, the PFD stored on the PCEF. PFD management performed by the SCS/AS may include creation of a new PFD, and removal or modification of an existing PFD. The PFD may be managed on the PCEF using a list. Each list is denoted by an application identifier, and all PFDs in the list correspond to the application identifier.

Figure 3:
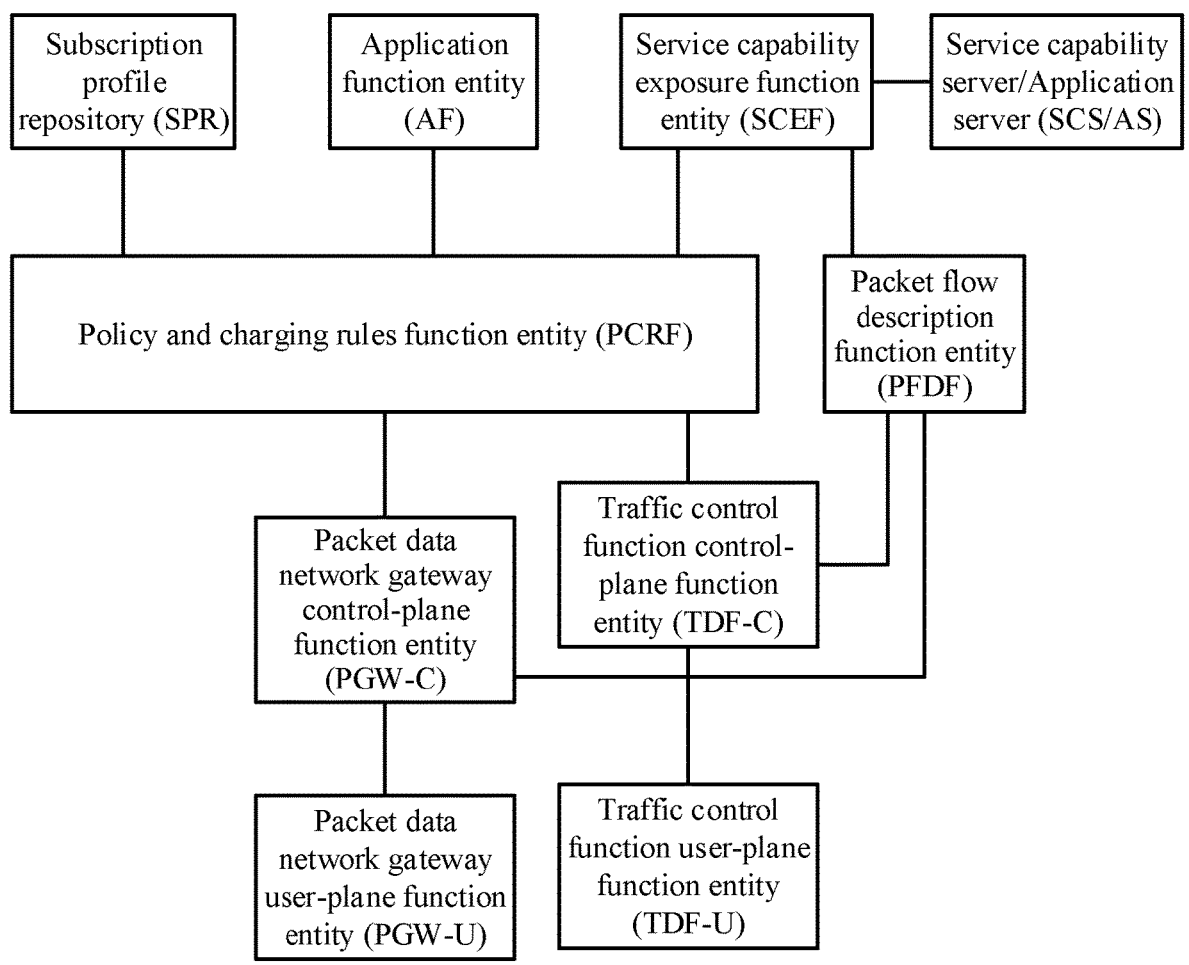
FIG. 3 is a schematic diagram of a C/U-separated architecture in a 4G network.

FIG. 3 is a schematic diagram of a C/U-separated architecture in a 4G network.

The C/U-separated architecture shown in FIG. 3 is basically the same as the architecture in FIG. 2, but a difference is that the PCEF in FIG. 2 is replaced with a PGW-C and a PGW-U, or that the TDF is replaced with a TDF-C and a TDF-U. The PGW-C implements a control plane function of the PCEF in the architecture in FIG. 2, and the PGW-U implements a user plane function of the PCEF in the architecture in FIG. 2. The TDF-C implements a control plane function of the TDF in the architecture in FIG. 2, and the TDF-U implements a user plane function of the TDF in the architecture in FIG. 2. In addition to the PGW-C, the PGW-U, and a PCRF, or in addition to the TDF-C, the TDF-U, and a PCRF, optionally, an AF, an SCEF, a PFDF, an SPR, or an SCS/AS may be further included. A PCC rule formulated by the PCRF is converted by the PGW-C into a PDR rule and one or more other rules associated with the PDR, and then the PGW-C sends the PDR rule and the one or more other rules to the PGW-U. The PGW-U controls service access of UE according to the PDR rule and the one or more other rules associated with the PDR that are delivered by the PGW-C. An ADC rule formulated by the PCRF is converted by the TDF-C into a PDR rule and one or more other rules associated with the PDR, and then the TDF-C sends the PDR rule and the one or more other rules to the TDF-U. The TDF-U controls service access of the UE according to the PDR rule and the one or more other rules associated with the PDR that are delivered by the TDF-C.

A process of managing a PFD on the PGW-U by the SCS/AS is basically the same as that described in FIG. 2. Details are not described herein again.

Figure 4:
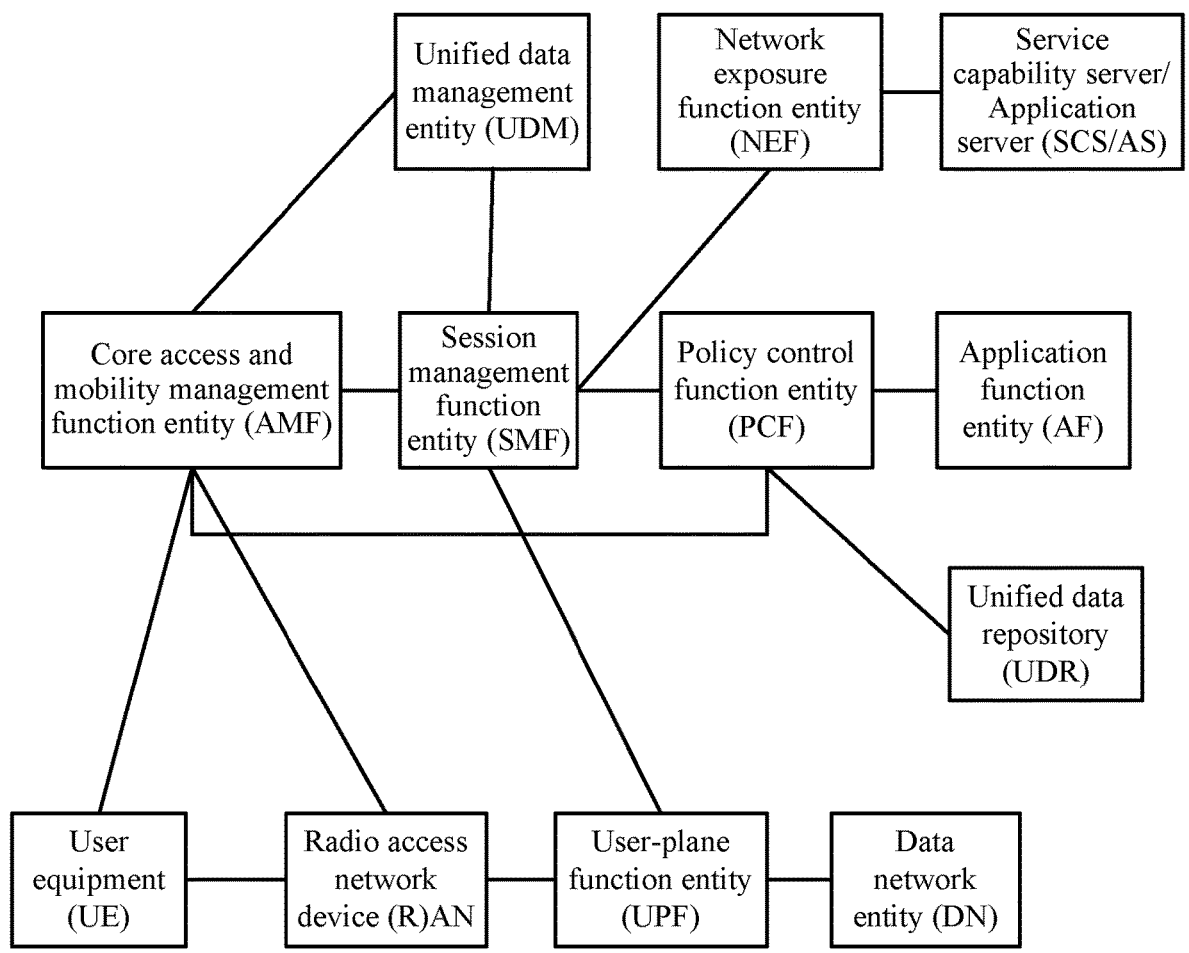
FIG. 4 is a schematic diagram of an architecture in a 5G network.

FIG. 4 is a schematic diagram of a 5G network architecture.

In the 5G network architecture, a PCF implements a function similar to that of the PCRF in the architecture in FIG. 3, an SMF implements a function similar to that of the PGW-C/TDF-C, and a UPF implements a function similar to that of the PGW-U/TDF-U. In addition to the SMF, the UPF, and the PCF, optionally, network elements such as a UDM, an NEF, an SCS/AS, an AMF, an AF, a UDR, and a DN may be further included. The UDR implements a function similar to that of the SPR. The NEF implements a function similar to that of the SCEF in the architecture in FIG. 3, and the PFDF function is also integrated into the NEF.

Therefore, in a 5G network, a PCC/ADC rule formulated by the PCF is converted by the SMF into a PDR rule and one or more other rules associated with the PDR. Then the SMF sends the PDR rule and the one or more other rules to the UPF. The UPF controls service access of UE according to the PDR rule and the one or more other rules associated with the PDR that are delivered by the SMF.

A process of managing a PFD on the UPF by the SCS/AS is basically the same as that described in FIG. 2. Details are not described herein again.

There are a plurality of devices in FIG. 1 to FIG. 4, for example, the enforcement function network element, the control function network element, the SPR, the AF, the SCEF, the SCS/AS, the PCRF, the PFDF, the PCEF, the TDF, the PGW, the PGW-C, the PGW-U, the TDF-C, the TDF-U, the UDM, the NEF, the AMF, the SMF, the PCF, the UDR, an (R)AN, the UPF, and the DN. It should be noted that network elements, entities, or servers are merely names for these devices. Names of these devices are not limited in the embodiments of this application.

Descriptions of the network architectures are provided in FIG. 2 to FIG. 4. With reference to the network architectures in FIG. 2 to FIG. 4, the following separately describes a policy control method provided in the embodiments of this application.

Figure 5:
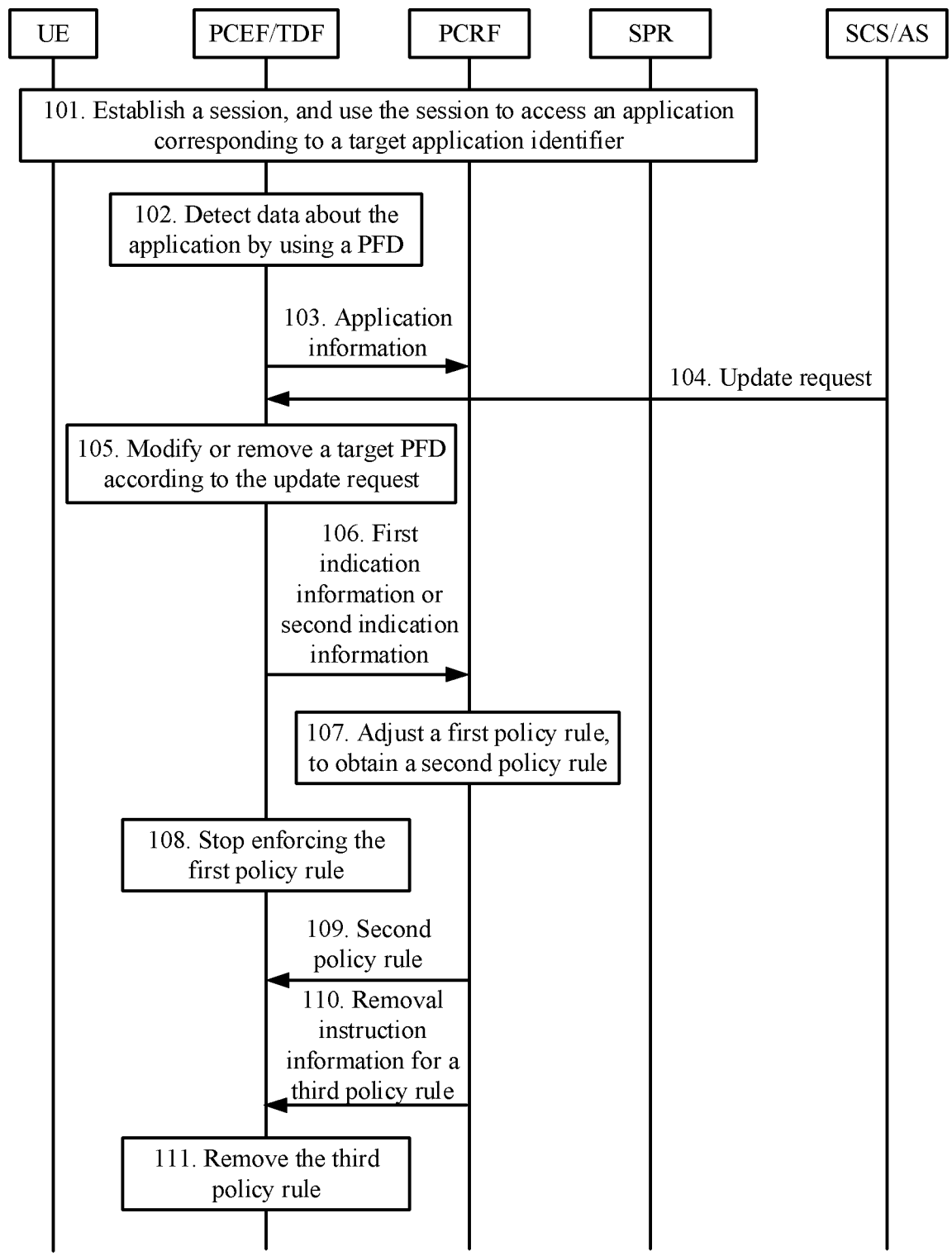
FIG. 5 is a schematic diagram of a policy control method in a C/U-not-separated architecture in a 4G network according to an embodiment of this application.

FIG. 5 is a schematic diagram of an embodiment of a policy control method in a C/U-not-separated architecture in a 4G network according to an embodiment of this application.

As shown in FIG. 5, the policy control method in the C/U-not-separated architecture in the 4G network according to this embodiment of this application includes the following steps.

Step 101. A UE establishes a session using a PCEF/TDF, and uses the session to access an application corresponding to a target application identifier.

A process of establishing the session by the UE using the PCEF/TDF may be as follows. The UE sends an IP-CAN session establishment request message to a network. The message may carry a session establishment-related parameter, such as a user identifier, a PDN identifier, or access network-related information. The network selects a PGW for the UE. The PGW receives the IP-CAN session establishment request message, and assigns an IP address to the UE.

The PCEF located in the PGW sends an IP-CAN session establishment indication message to a PCRF. After receiving the IP-CAN session establishment indication message, the PCRF may further send a TDF session establishment request message to the TDF.

If the PCRF has no user subscription information, the PCRF interacts with an SPR to obtain the subscription information. A subscription information obtaining process may be as follows: The PCRF provides the SPR with information such as the user identifier and the PDN identifier, and the SPR returns the corresponding subscription information based on the user identifier and the PDN identifier.

The PCRF makes a policy decision based on the subscription information, the access network-related information, and/or a network policy. The PCRF formulates a first policy rule: a PCC rule 1, and makes an event trigger Event Trigger. The PCC rule 1 carries an Application Id. The Application Id carried in the PCC rule 1 is the target application identifier. The Application Id corresponds to a particular application detection filter configured in the PCEF. The PCC rule 1 may further carry a QoS parameter, a charging parameter, a traffic steering parameter, or the like. If the PCRF decides that detected start indication information of the application does not need to be reported, the PCC rule 1 further carries a Mute Notification parameter. If the PCC rule 1 carries no Mute Notification parameter, the PCEF needs to report the detected start indication information of the application and detected subsequent stop indication information of the application to the PCRF.

The PCRF returns a response message to the PCEF, and the message carries the PCC rule 1.

The PCEF installs or activates the PCC rule 1, and returns a response message to the UE, to complete UE session establishment.

If the TDF is deployed in the network, when the UE establishes an IP-CAN session using the PCEF, the PCRF formulates an ADC rule. In this case, the first policy rule is an ADC rule 1. A function and content of the ADC rule 1 are the same as those of the PCC rule 1.

The PCRF sends a request message to the TDF, where the message carries the ADC rule 1, and establishes a TDF session, where the TDF session is in a one-to-one correspondence with the IP-CAN session.

The TDF installs or activates the ADC rule 1, and returns an acknowledgment message to the PCRF.

The UE accesses the application using the established IP-CAN/TDF session. For example, the UE accesses the application corresponding to the Application Id.

Step 102. The PCEF/TDF detects, using a PFD associated with the Application Id, data about the application corresponding to the Application Id.

Because a PFD usually corresponds to a service data flow or an IP flow of the application, detection may be performed based on the service data flow or the IP flow.

In this step, a correspondence between the detected data about the application and the PFD used for detection may be stored after the detection.

Step 103. The PCEF/TDF reports the detected start indication information of the application to the PCRF.

The start indication information may include an application start indication and the Application Id. In implementation, the application start indication may carry an application start app_start value using the event trigger.

The start indication information may further include service data flow description information and a corresponding instance identifier (Id).

Step 104. The PCEF/TDF receives an update request, where the update request is used to instruct to modify or remove a target PFD associated with the Application Id.

The update request is sent by a PFDF to the PCEF/TDF. The update request is triggered by an SCS/AS, but may further pass through an SCEF and the PFDF. Names of requests sent between every two function entities may be different, but all these requests are intended to finally trigger the PFDF to send the update request to the PCEF/TDF.

Step 105. The PCEF/TDF modifies or removes the target PFD according to the update request.

The modification or removal herein may be understood with reference to Table 2. If the target PFD is a PFD 2, Table 3 is obtained after Table 2 is updated.

TABLE 3

| PFD list for an application identifier 1 | |
|---|---|
| PFD identifier | PFD content |
| PFD ID1 | 3-tuple 1 |
| PFD ID3 | Domain name |
| PFD ID4 | 3-tuple 2 |

Step 106. Specific to a session for which a first policy rule including the target application identifier is installed or activated, the PCEF/TDF sends first indication information or second indication information to the PCRF if the PCEF/TDF has detected the data about the application corresponding to the target application identifier using the target PFD.

The session in this embodiment is an IP-CAN session or a TDF session.

In this step, whether there is data about the application corresponding to the target PFD may be determined based on the correspondence stored in step 102 and the target PFD.

Conditions for sending the first indication information or the second indication information by the PCEF/TDF to the PCRF may include the following three cases.

In a first case, the data about the application has been detected, and the start indication information of the application has been reported in step 103.

In a second case, the data about the application has been detected, the start indication information of the application has been reported in step 103, and the target PFD is a last PFD that is used to detect the data about the application among the PFD associated with the target application identifier.

In a third case, the data about the application has been detected, the start indication information of the application has been reported in step 103, and the target PFD is a last PFD associated with the target application identifier or the target PFD is a last PFD that is associated with the target application identifier and that is provided by a packet flow description function network element.

If any one of these three cases is satisfied, the first indication information or the second indication information may be reported.

In addition, if the second case or the third case is satisfied, and the start indication information reported in step 103 includes the application start indication and the Application Id, the first indication information includes an application stop indication and the application identifier. The first indication information may further include indication information that the target PFD has been removed or modified, and the second indication information includes the Application Id and the indication information that the target PFD has been removed or modified. Information that the target PFD has been removed may be PFD_removed or a PFD_removed indication. Information that the target PFD has been modified may be PFD_modified and content resulting from the modification.

If the first case is satisfied, and the start indication information of the application reported in step 103 includes the application start indication, the application identifier, the service data flow description information, and the corresponding instance identifier, the first indication information includes an application stop indication, the application identifier, and the instance identifier, and the second indication information includes the application identifier, indication information that the target PFD has been removed or modified, and the instance identifier.

This step is performed for each session for which the first policy rule including the target application identifier is installed or activated on the enforcement function network element. Therefore, this step may be performed many times.

Step 107. The PCRF adjusts the first policy rule based on the first indication information or the second indication information, to obtain a second policy rule.

The second policy rule is used by the PCEF/TDF to control subsequent data about the application. The subsequent data is data about the application resulting from removal or modification of the target PFD.

Optionally, in step 108, the PCEF/TDF stops enforcing the first policy rule for the data about the application that is detected using the target PFD.

Step 108 is unnecessarily performed after step 107.

Optionally, in step 109, the PCRF sends the second policy rule to the PCEF/TDF.

Optionally, in step 110, if the PCRF has determined a third policy rule based on the start indication information after the start indication information of the application is reported in step 103, the PCRF sends removal instruction information for the third policy rule to the PCEF.

Optionally, in step 111, the PCEF removes the third policy rule according to the removal instruction information, and installs or activates the second policy rule.

In this case, regardless of whether the enforcement function network element is the PCEF or the TDF, the PCRF sends the third rule to the PCEF, and the PCEF removes the third rule.

In the policy control method described above, after a PFD of the PCEF/TDF has been removed or modified, the PCEF/TDF notifies the PCRF in a timely manner, such that the PCRF adjusts a policy rule in a timely manner based on an actual status of the PFD of the PCEF/TDF, and a policy of a third-party application matches a policy of an operator.

Figure 6A:
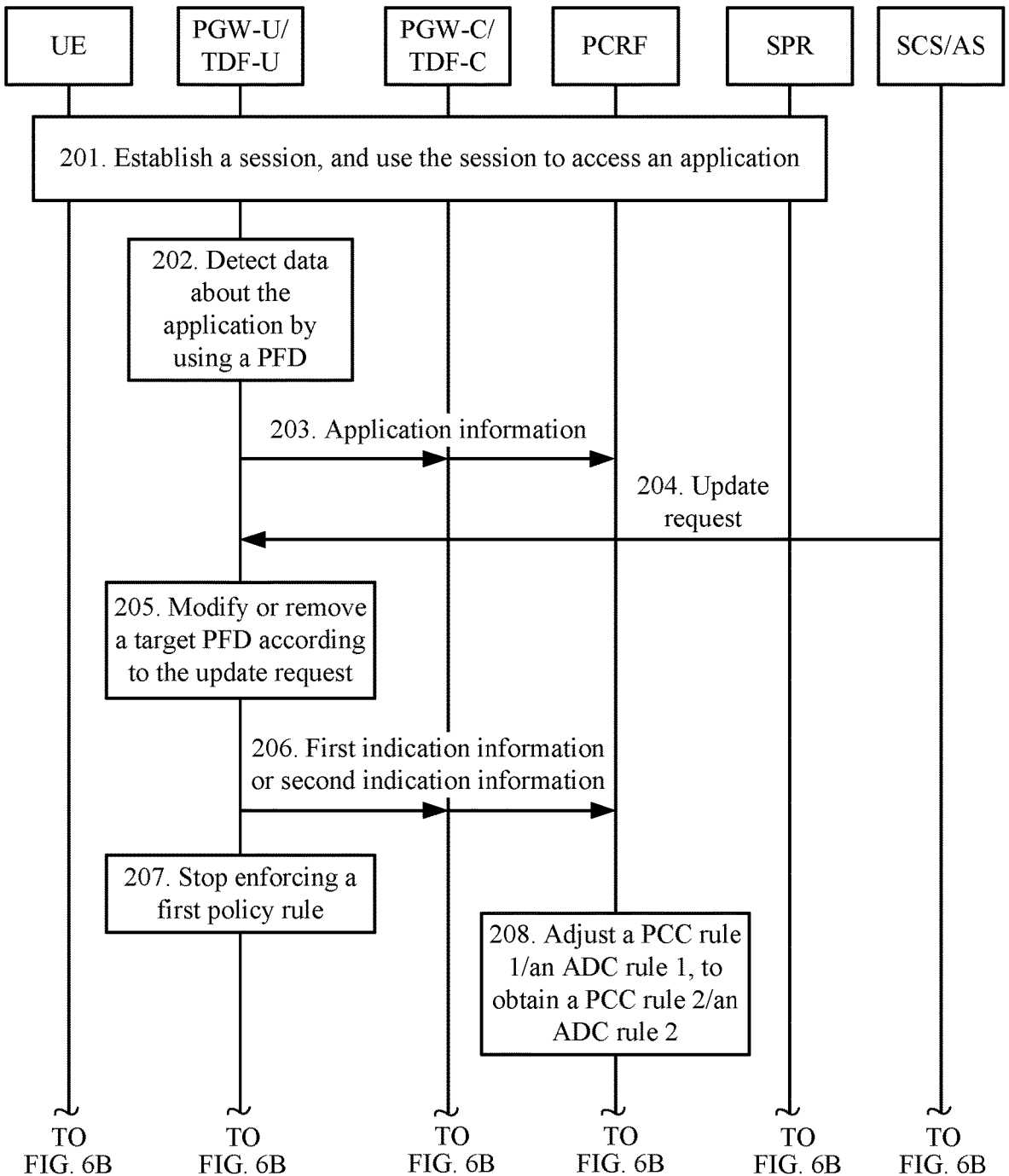
FIG. 6A and FIG. 6B are schematic diagrams of a policy control method in a C/U-separated architecture in a 4G network according to an embodiment of this application.
Figure 6B:
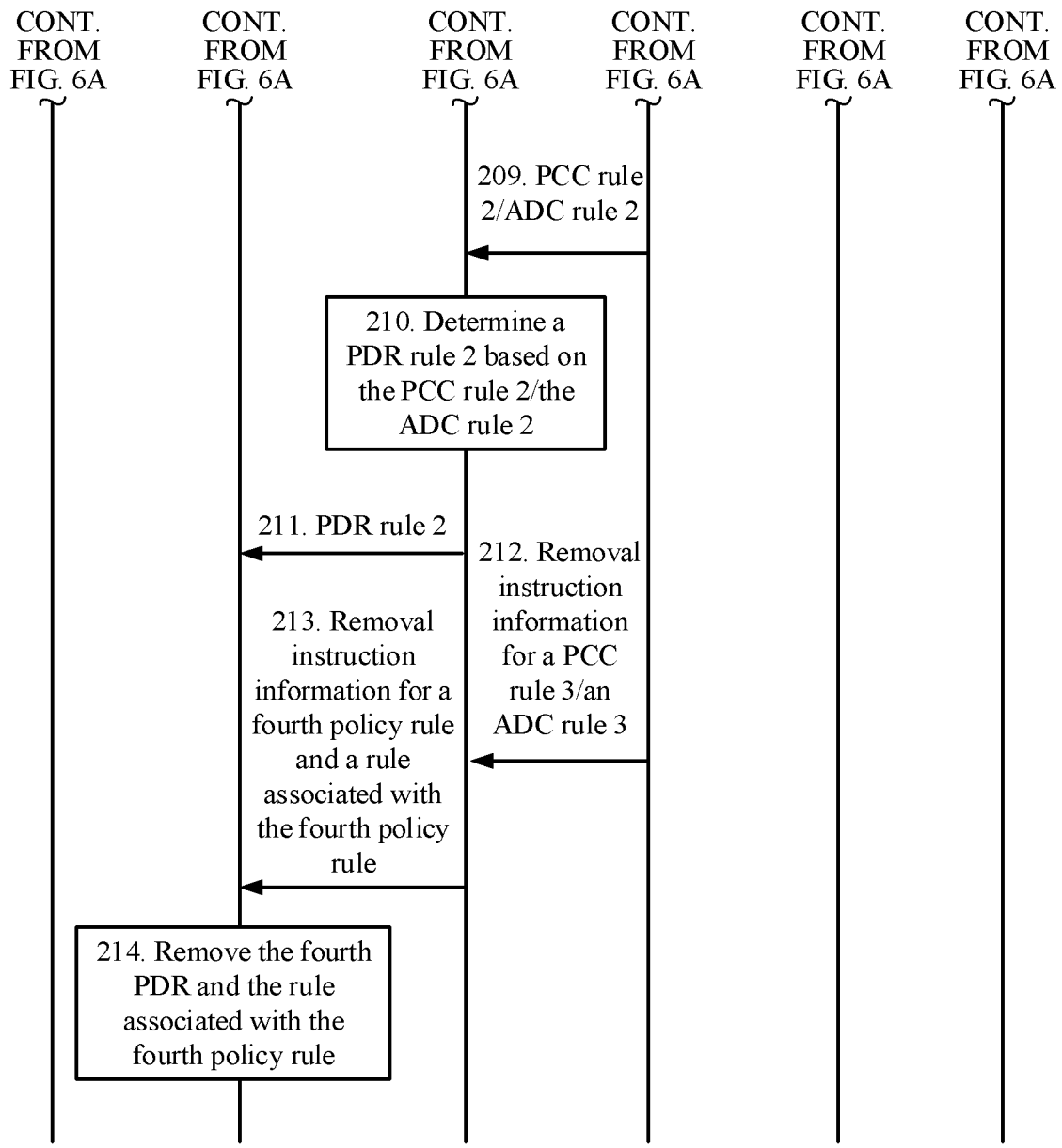

FIG. 6A and FIG. 6B are schematic diagrams of a policy control method in a C/U-separated architecture in a 4G network according to an embodiment of this application.

As shown in FIG. 6A and FIG. 6B, the policy control method in the C/U-separated architecture in the 4G network according to this embodiment of this application includes the following steps.

Step 201. A UE establishes a session using a PCW-U and a PCW-C, and uses the session to access an application corresponding to a target application identifier.

A process of establishing the session by the UE using the PCW-U may be as follows. The UE sends an IP-CAN session establishment request message to a network. The message may carry a session establishment-related parameter, such as a user identifier, a PDN identifier, or access network-related information. The network selects a PGW-C for the UE. The PGW-C receives the IP-CAN session establishment request message, and assigns an IP address to the UE.

The PGW-C sends an IP-CAN session establishment indication message to a PCRF. After receiving the IP-CAN session establishment indication message, the PCRF may further send a TDF session establishment request message to a TDF-C.

If the PCRF has no user subscription information, the PCRF interacts with an SPR to obtain the subscription information. A subscription information obtaining process may be as follows: The PCRF provides the SPR with information such as the user identifier and the PDN identifier, and the SPR returns the corresponding subscription information based on the user identifier and the PDN identifier.

The PCRF makes a policy decision based on the subscription information, the access network-related information, and/or a network policy. The PCRF formulates a PCC rule 1, and makes an event trigger Event Trigger. The PCC rule 1 carries an Application Id. The Application Id carried in the PCC rule 1 is the target application identifier. The Application Id corresponds to a particular application detection filter (Application detection filter) configured in a PCEF. The PCC rule 1 may further carry a QoS parameter, a charging parameter, a traffic steering parameter, or the like. If the PCRF decides that detected start indication information of the application does not need to be reported, the PCC rule 1 further carries a Mute Notification parameter. If the PCC rule 1 carries no Mute Notification parameter, the PGW-C needs to report the detected start indication information of the application to the PCRF.

The PCRF returns a response message to the PGW-C, and the message carries the PCC rule 1.

The PGW-C formulates, based on the PCC rule 1, a first policy rule, that is, a PDR 1. In addition, the PGW-C further formulates a URR 1 and one or more other rules. The URR 1 is used to instruct the PGW-U to report the detected start indication information of the application and detected stop indication information of the application, and the URR 1 and the one or more other rules are associated with the PDR 1.

The PGW-C provides the PGW-U with the PDR 1, the URR 1, and the associated one or more other rules, and the PGW-C returns an acknowledgment message to the UE.

The PGW-U installs or activates the PDR 1, the URR 1, and the associated one or more other rules, to complete UE session establishment.

The UE accesses the application using an established IP-CAN session. For example, the UE accesses the application corresponding to the Application Id.

For a TDF, the first policy rule specified by the PCRF may be an ADC rule 1. The PCRF sends a request message to the TDF-C, where the message carries the ADC rule 1. For a function and content of the ADC rule 1, refer to the PCC rule 1 for understanding. Details are not described herein again.

The TDF-C formulates, based on the ADC rule 1, the first policy rule, that is, the PDR 1. In addition, the TDF-C further formulates the URR 1 and the one or more other rules. The URR 1 is used to instruct a TDF-U to report the detected start indication information of the application and the detected stop indication information of the application, and the URR 1 and the one or more other rules are associated with the PDR 1.

The TDF-U installs or activates the PDR 1, the URR 1, and the associated one or more other rules, and returns an acknowledgment message to the PCRF.

Step 202. The PGW-U/TDF-U detects, using a PFD associated with the Application Id, data about the application corresponding to the Application Id.

Because a PFD usually corresponds to a service data flow or an IP flow of the application, detection may be performed based on the service data flow or the IP flow.

In this step, a correspondence between the detected data about the application and the PFD used for detection may be stored after the detection.

Step 203. The PGW-U reports the detected start indication information of the application to the PGW-C, and the PGW-C forwards the start indication information to the PCRF. Alternatively, the TDF-U reports the detected start indication information of the application to the TDF-C, and the TDF-C forwards the start indication information to the PCRF.

The start indication information may include an application start indication and the Application Id. In implementation, the application start indication may carry an application start app_start value using the event trigger.

The start indication information may further include service data flow description information and a corresponding instance Id.

Step 204. The PGW-U/TDF-U receives an update request, where the update request is used to instruct to modify or remove a target PFD associated with the Application Id.

The update request is sent by the PGW-C to the PGW-U or sent by the TDF-C to the TDF-U. The update request is triggered by an SC S/AS, but further passes through an SCEF, a PFDF, and the PGW-C/TDF-C. Names of requests sent between every two function entities may be different, but all these requests are intended to finally trigger the PGW-C to send the update request to the PGW-U.

Step 205. The PGW-U/TDF-U modifies or removes the target PFD according to the update request.

The modification or removal herein may be understood with reference to a change from Table 2 to Table 3 in the embodiment corresponding to FIG. 5.

Step 206. Specific to a session for which the first policy rule including the target application identifier is installed or activated, if the PGW-U/TDF-U has detected the data about the application corresponding to the target application identifier using the target PFD, the PGW-U sends first indication information or second indication information to the PGW-C or the TDF-U sends first indication information or second indication information to the TDF-C, and the PGW-C/TDF-C forwards the first indication information or the second indication information to the PCRF.

The session in this embodiment is a PFCP session, and the PFCP session is in a one-to-one correspondence with the IP-CAN session.

In this step, whether there is data about the application corresponding to the target PFD may be determined based on the correspondence stored in step 202 and the target PFD.

Conditions for sending the first indication information or the second indication information by the PGW-U to the PGW-C or sending the first indication information or the second indication information by the TDF-U to the TDF-C may include the following three cases.

In a first case, the data about the application has been detected, and the start indication information has been reported in step 203.

In a second case, the data about the application has been detected, the start indication information has been reported in step 203, and the target PFD is a last PFD that is used to detect the data about the application among the PFD associated with the target application identifier.

In a third case, the data about the application has been detected, the start indication information has been reported in step 203, and the target PFD is a last PFD associated with the target application identifier or the target PFD is a last PFD that is associated with the target application identifier and that is provided by a packet flow description function network element.

If any one of the three cases is satisfied, the first indication information or the second indication information may be reported.

In addition, if the second case or the third case is satisfied, and the start indication information reported in step 203 includes the application start indication and the Application Id, the first indication information includes an application stop indication and the application identifier. The first indication information may further include indication information that the target PFD has been removed or modified, and the second indication information includes the Application Id and the indication information that the target PFD has been removed or modified. Indication information that the target PFD has been removed may be PFD_removed or a PFD_removed indication. Indication information that the target PFD has been modified may be PFD_modified and content resulting from the modification.

If the first case is satisfied, and the start indication information reported in step 203 includes the application start indication, the application identifier, the service data flow description information, and the corresponding instance identifier, the first indication information includes an application stop indication of the event trigger, the application identifier, and the instance identifier, and the second indication information includes the application stop indication of the event trigger, the application identifier, indication information that the target PFD has been removed or modified, and the instance identifier.

Optionally, in step 207, the PGW-U/TDF-U stops enforcing the first policy rule for the data about the application that is detected using the target PFD.

Step 207 may be performed before step 208 or after step 208.

Step 208. Based on the first indication information or the second indication information, the PCRF adjusts the PCC rule 1 to obtain a PCC rule 2, or adjusts the ADC rule 1 to obtain an ADC rule 2.

Optionally, in step 209, the PCRF sends the PCC rule 2 to the PGW-C, or the PCRF sends the ADC rule 2 to the TDF-C.

Optionally, in step 210, the PGW-C determines second policy rules based on the PCC rule 2, or the TFD-C determines second policy rules based on the ADC rule 2, where the second policy rules are a PDR rule 2 and associated one or more other rules.

The second policy rule is used by the PGW-U or the TDF-U to control subsequent data about the application. The subsequent data is data about the application resulting from removal or modification of the target PFD.

Optionally, in step 211, the PGW-C sends the second policy rules to the PGW-U, or the TDF-C sends the second policy rules to the TDF-U.

Step 212. If the PCRF has determined a PCC rule 3 based on the start indication information after the start indication information is reported in step 203, the PCRF sends removal instruction information for the PCC rule 3 to the PGW-C.

Likewise, if the PCRF has determined an ADC rule 3 based on the start indication information, the PCRF sends removal instruction information for the ADC rule 3 to the TDF-C.

Step 213. If the PGW-C/TDF-C has determined, based on the PCC rule 3/the ADC rule 3, a PDR rule 3 and a rule associated with the PDR rule 3, that is, a fourth policy rule and a rule associated with the fourth policy rule, the PGW-C sends removal instruction information for the fourth policy rule to the PGW-U.

The rule associated with the fourth policy rule may be a rule such as a URR or a QER.

Step 214. The PGW-U/TDF-U removes the fourth policy rule according to the removal instruction information, and installs or activates the second policy rule.

In the policy control method described above, after a PFD of the PGW-U/TDF-U has been removed or modified, the PGW-U/TDF-U notifies the PGW-C/TDF-C in a timely manner, such that the PGW-C/TDF-C adjusts a policy rule in a timely manner based on an actual status of the PFD of the PGW-U/TDF-U, and a policy of a third-party application matches a policy of an operator.

Figure 7A:
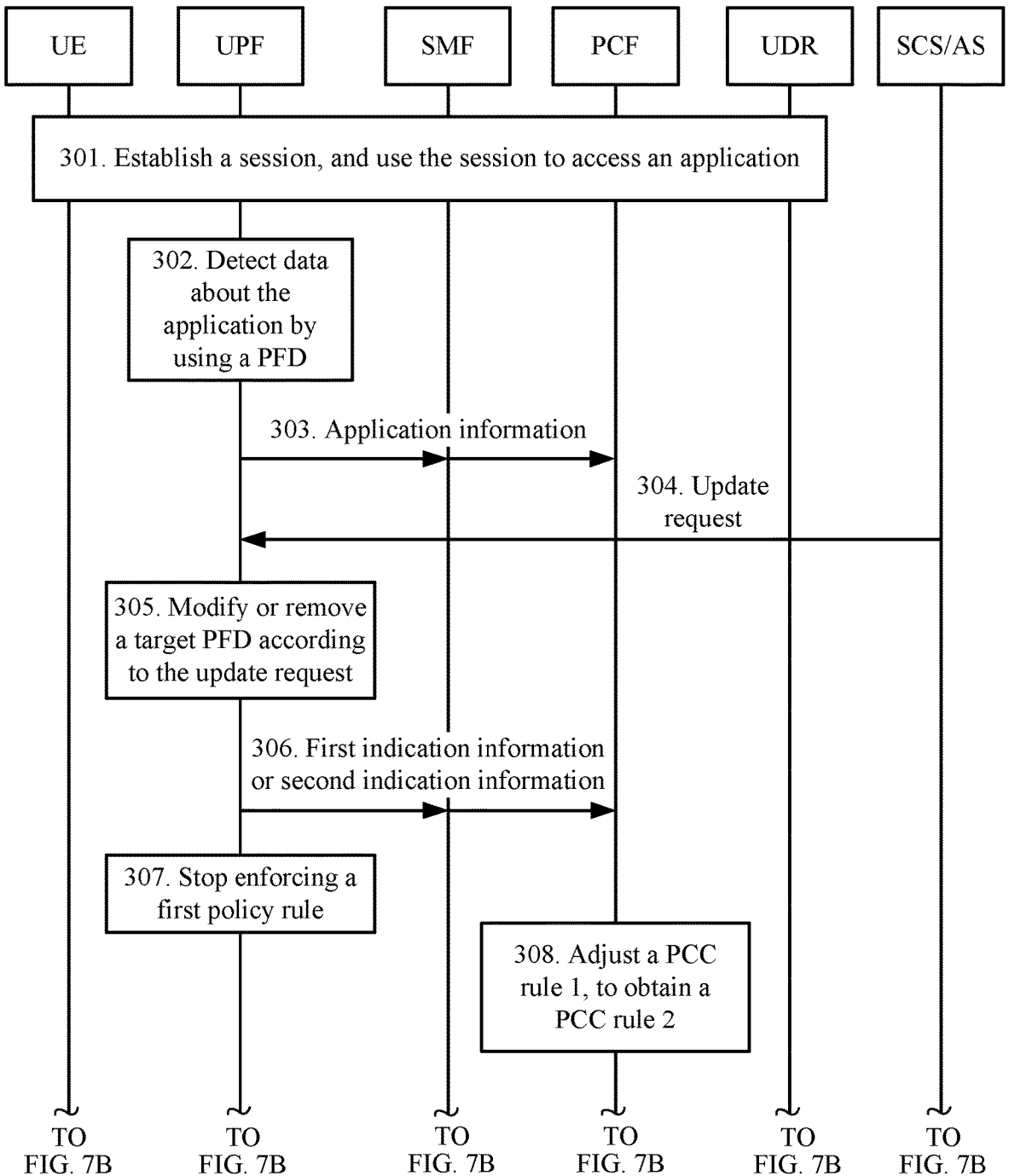
FIG. 7A and FIG. 7B are schematic diagrams of a policy control method in a 5G network according to an embodiment of this application.
Figure 7B:
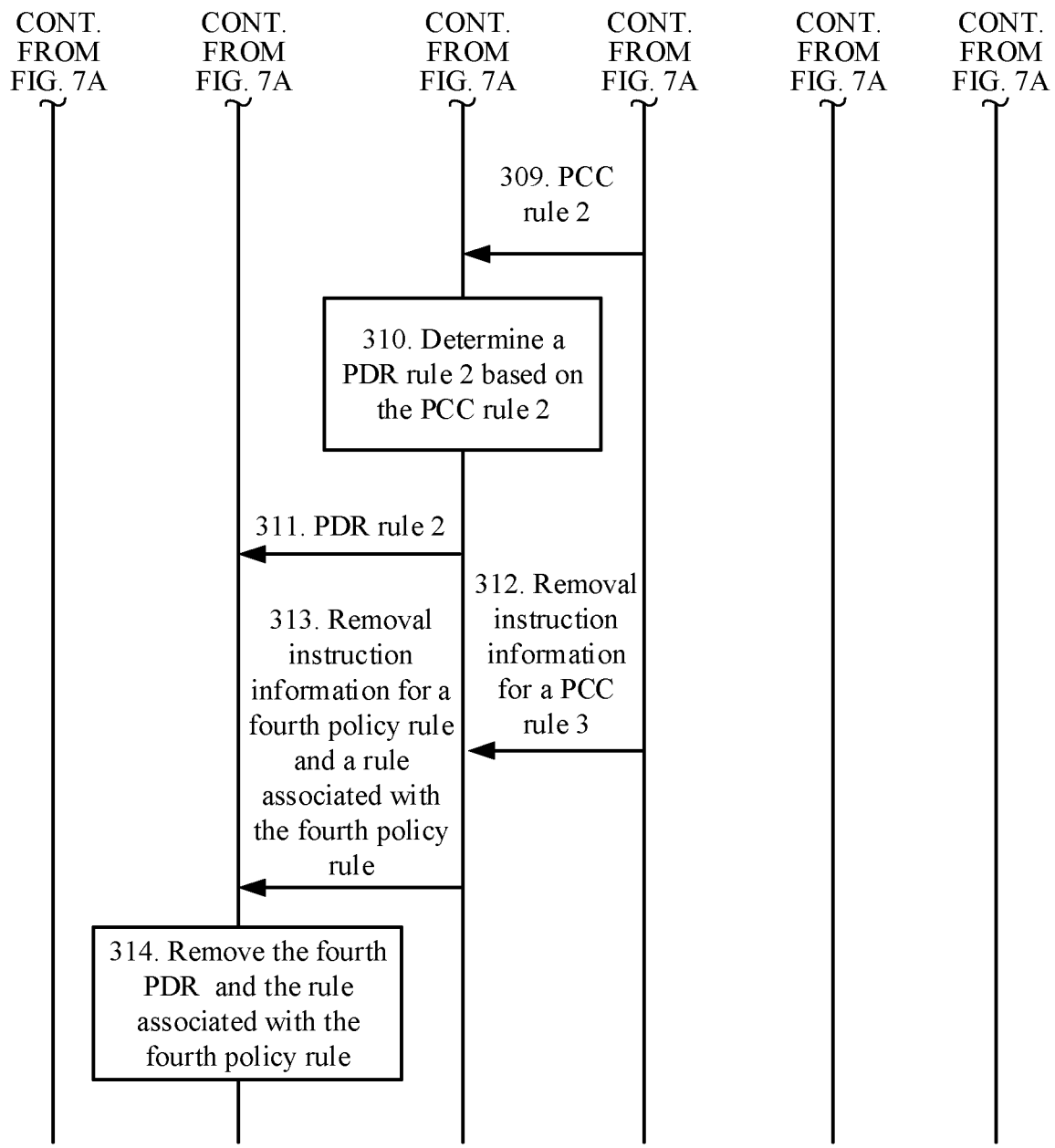

FIG. 7A and FIG. 7B are schematic diagrams of a policy control method in a 5G architecture according to an embodiment of this application.

As shown in FIG. 7A and FIG. 7B, the policy control method in the 5G architecture according to this embodiment of this application includes the following steps.

Step 301. A UE establishes a session using a UPF and an SMF, and uses the session to access an application corresponding to a target application identifier.

A process of establishing the session by the UE using the UPF/SMF may be as follows. The UE sends a PDU session establishment request message to a network. The message may carry a session establishment-related parameter, such as a user identifier, a DN identifier, or access network-related information. The network selects an SMF for the UE. The SMF receives the PDU session establishment request message, and assigns an IP address to the UE.

The SMF sends a PDU session establishment indication message to a PCF.

If the PCF has no user subscription information, the PCF interacts with an SPR to obtain the subscription information. A subscription information obtaining process may be as follows: The PCF provides the SPR with information such as the user identifier and the DN identifier, and the SPR returns the corresponding subscription information based on the user identifier and the DN identifier.

The PCF makes a policy decision based on the subscription information, the access network-related information, and/or a network policy. The PCF formulates a PCC rule 1, and makes an event trigger Event Trigger. The PCC rule 1 carries an Application Id. The Application Id carried in the PCC rule 1 is the target application identifier. The Application Id corresponds to a particular application detection filter configured in a PCEF. The PCC rule 1 may further carry a QoS parameter, a charging parameter, a traffic steering parameter, or the like. If the PCF decides that detected start indication information of the application does not need to be reported, the PCC rule 1 further carries a Mute Notification parameter. If the PCC rule 1 carries no Mute Notification parameter, the SMF needs to report the detected start indication information of the application to the PCF.

The PCF returns a response message to the SMF, and the message carries the PCC rule 1.

The SMF formulates, based on the PCC rule 1, a first policy rule, that is, a PDR rule 1. In addition, the SMF further formulates a URR 1 and one or more other rules based on the PCC rule 1. The URR 1 is used to instruct the UPF to report the detected start indication information of the application and detected stop indication information of the application, and the URR 1 and the one or more other rules are associated with the PDR 1.

The SMF provides the UPF with the PDR rule 1, the URR 1, and the associated one or more other rules, and the SMF returns an acknowledgment message to the UE. The SMF sends the foregoing rules using a PFCP session established between the SMF and the UPF, and the PFCP session is in a one-to-one correspondence with a PDU session.

The UPF installs or activates the PDR rule 1, the URR 1 and the associated one or more other rules.

The UE accesses the application using the established PDU session. For example, the UE accesses the application corresponding to the Application Id.

Step 302. The UPF detects, using a PFD associated with the Application Id, data about the application corresponding to the Application Id.

In this step, a correspondence between the detected data about the application and the PFD used for detection may be stored after the detection.

Step 303. The UPF reports the detected start indication information of the application to the SMF, and the SMF forwards the start indication information to the PCF.

The start indication information may include an application start indication and the Application Id.

The start indication information may further include service data flow description information and a corresponding instance Id.

Step 304. The UPF receives an update request, where the update request is used to instruct to modify or remove a target PFD associated with the Application Id.

The update request is sent by the SMF to the UPF. The update request is triggered by an SCS/AS, but further passes through an NEF, a PFDF and the SMF. Names of requests sent between every two function entities may be different, but all these requests are intended to finally trigger the SMF to send the update request to the UPF.

Step 305. The UPF modifies or removes the target PFD according to the update request.

The modification or removal herein may be understood with reference to a change from Table 2 to Table 3 in the embodiment corresponding to FIG. 5.

Step 306. Specific to a session for which the first policy rule including the target application identifier is installed or activated, if the UPF has detected the data about the application corresponding to the target application identifier using the target PFD, the UPF sends first indication information or second indication information to the SMF, and the SMF forwards the first indication information or the second indication information to the PCF.

In this step, whether there is data about the application corresponding to the target PFD may be determined based on the correspondence stored in step 302 and the target PFD.

Conditions for sending the first indication information or the second indication information by the UPF to the SMF may include the following three cases.

In a first case, the data about the application has been detected, and the start indication information has been reported in step 303.

In a second case, the data about the application has been detected, the start indication information has been reported in step 303, and the target PFD is a last PFD that is used to detect the data about the application among the PFD associated with the target application identifier.

In a third case, the data about the application has been detected, the start indication information has been reported in step 303, and the target PFD is a last PFD associated with the target application identifier or the target PFD is a last PFD that is associated with the target application identifier and that is provided by a packet flow description function network element.

If any one of the three cases is satisfied, the first indication information or the second indication information may be reported.

In addition, if the second case or the third case is satisfied, and the start indication information reported in step 303 includes the application start indication and the Application Id, the first indication information includes an application stop indication and the application identifier. The first indication information may further include indication information that the target PFD has been removed or modified, and the second indication information includes the Application Id and the indication information that the target PFD has been removed or modified. Indication information that the target PFD has been removed may be PFD_removed or a PFD_removed indication. Indication information that the target PFD has been modified may be PFD_modified and content resulting from the modification.

If the first case is satisfied, and the start indication information reported in step 303 includes the application start indication of the event trigger, the application identifier, the service data flow description information, and the corresponding instance identifier, the first indication information includes an application stop indication of the event trigger, the application identifier, and the instance identifier, and the second indication information includes the application stop indication of the event trigger, the application identifier, indication information that the target PFD has been removed or modified, and the instance identifier.

Optionally, in step 307, the UPF stops enforcing the first policy rule for the data about the application that is detected using the target PFD.

Step 307 may be performed before step 308 or after step 308.

Step 308. The PCF adjusts the PCC rule 1 based on the first indication information or the second indication information, to obtain a PCC rule 2.

Optionally, in step 309, the PCF sends the PCC rule 2 to the SMF.

Optionally, in step 310, the SMF determines second policy rules based on the PCC rule 2, where the second policy rules are a PDR rule 2 and associated one or more other rules.

The second policy rules are used by the UPF to control subsequent data about the application. The subsequent data is data about the application resulting from removal or modification of the target PFD.

Optionally, in step 311, the SMF sends the second policy rules to the UPF.

Optionally, in step 312, if the PCF has determined a PCC rule 3 based on the start indication information after the start indication information is reported in step 303, the PCF sends removal instruction information for the PCC rule 3 to the SMF.

Optionally, in step 313, if the SMF has determined, based on the PCC rule 3, a PDR rule 3 and a rule associated with the PDR rule 3, that is, a fourth policy rule and a rule associated with the fourth policy rule, the SMF sends removal instruction information for the fourth policy rule to the UPF.

The rule associated with the fourth policy rule may be a rule such as a URR or a QER.

Optionally, in step 314, the UPF removes the fourth policy rule according to the removal instruction information, and installs or activates the second policy rule.

In the policy control method described above, after a PFD of the UPF has been removed or modified, the UPF notifies the SMF in a timely manner, such that the SMF adjusts a policy rule in a timely manner based on an actual status of the PFD of the UPF, and a policy of a third-party application matches a policy of an operator.

It should be noted that a name of a message or a name of a parameter in a message between network elements in the following embodiments of this application is merely an example, and another name may be used during implementation. For example, an update message may also be referred to as an indication message. Descriptions are uniformly provided herein. This is not specifically limited in this embodiment of this application.

The foregoing mainly describes the solutions provided in the embodiments of this application from a perspective of interaction between network elements. It may be understood that, to implement the foregoing functions, the enforcement function network element and the control function network element include corresponding hardware structures and/or software modules that perform the functions. A person skilled in the art should be aware that, in combination with example modules and algorithm steps described in the embodiments disclosed in this specification, this application can be implemented using hardware or a combination of hardware and computer software. Whether a function is implemented using hardware or computer software driving hardware depends on a particular application and a design constraint of the technical solution. A person skilled in the art may use a different method to implement the described function for each particular application, but it should not be considered that the implementation goes beyond the scope of this application.

From a perspective of a hardware structure, the enforcement function network element 10 or the control function network element in FIG. 1 may be implemented by a physical device, may be implemented jointly by a plurality of physical devices, or may be a logical function module inside a physical device. This is not specifically limited in the embodiments of this application.

Figure 8:
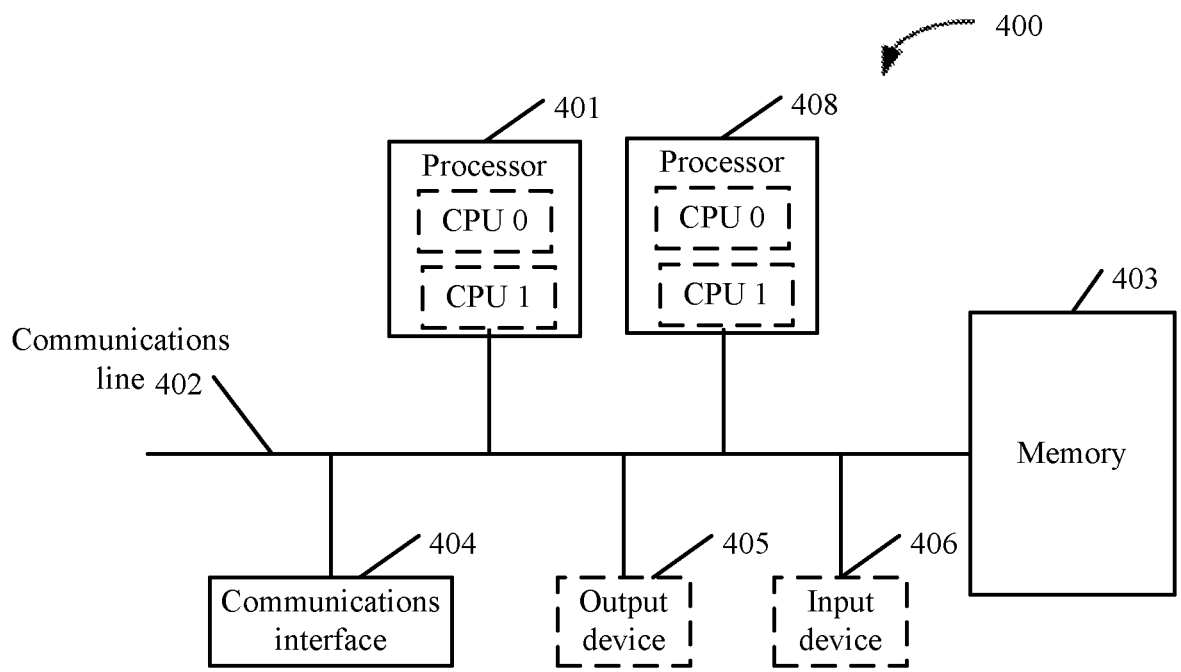
FIG. 8 is a schematic diagram of a communications device according to an embodiment of this application.

For example, the enforcement function network element 10 or the control function network element in FIG. 1 may be implemented by a communications device in FIG. 8. FIG. 8 is a schematic structural diagram of hardware of a communications device according to an embodiment of this application. The communications device 400 includes at least one processor 401, a communications line 402, a memory 403, and at least one communications interface 404.

The processor 401 may be a general-purpose central processing unit (CPU), a microprocessor, an application-specific integrated circuit (ASIC), or one or more integrated circuits configured to control program execution of the solution in this application.

The communications line 402 may include a path for transmitting information between the foregoing components.

The communications interface 404 uses any apparatus such as a transceiver to communicate with another device or a communications network, such as the Ethernet, a radio access network (RAN), or a wireless local area network (WLAN).

The memory 403 may be a read-only memory (ROM) or another type of static storage device that can store static information and an instruction, a random access memory (RAM) or another type of dynamic storage device that can store information and an instruction, an electrically erasable programmable read-only memory (EEPROM), a compact disc read-only memory (CD-ROM) or other optical disk storage, optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer. However, this is not limited thereto. The memory may exist independently and is connected to the processor using the communications line 402. The memory may be alternatively integrated with the processor.

The memory 403 is configured to store a computer executable instruction for performing the solution in this application, and the processor 401 controls execution. The processor 401 is configured to execute the computer executable instruction stored in the memory 403, to implement a policy control method provided in the following embodiments of this application.

Optionally, the computer executable instruction in this embodiment of this application may also be referred to as application program code. This is not specifically limited in this embodiment of this application.

During implementation, in an embodiment, the processor 401 may include one or more CPUs, for example, a CPU 0 and a CPU 1 in FIG. 8.

During implementation, in an embodiment, the communications device 400 may include a plurality of processors, for example, the processor 401 and a processor 408 in FIG. 8. Each of these processors may be a single-core (single-CPU) processor, or may be a multi-core (multi-CPU) processor. The processor herein may be one or more devices, circuits, and/or processing cores configured to process data (such as a computer program instruction).

During implementation, in an embodiment, the communications device 400 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (CRT) display device, or a projector. The input device 406 communicates with the processor 401, and may receive user input in a plurality of manners. For example, the input device 406 may be a mouse, a keyboard, a touchscreen device, or a sensing device.

The communications device 400 may be a general-purpose device or a dedicated device. During implementation, the communications device 400 may be a desktop computer, a portable computer, a network server, a palmtop computer (PDA), a mobile phone, a tablet computer, a wireless terminal device, an embedded device, or a device with a structure similar to that in FIG. 8. A type of the communications device 400 is not limited in this embodiment of this application.

In this embodiment of this application, function modules of the enforcement function network element and the control function network element may be obtained through division based on the foregoing method examples. For example, each function module may be obtained through division in correspondence to each function, or at least two functions may be integrated into one processing module. The integrated module may be implemented in a form of hardware, or may be implemented in a form of a software function module. It should be noted that module division in the embodiments of this application is an example and is merely logical function division. During actual implementation, there may be another division manner.

Figure 9:
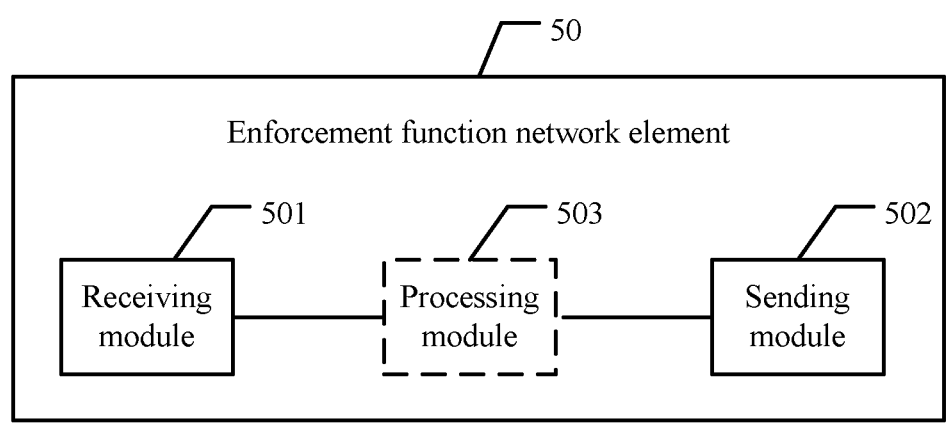
FIG. 9 is a schematic diagram of an enforcement function network element according to an embodiment of this application.

For example, when function modules are implemented through integration, FIG. 9 is a schematic structural diagram of an enforcement function network element.

As shown in FIG. 9, the enforcement function network element provided in this embodiment of this application includes a receiving module 501, a processing module 503, and a sending module 502. The receiving module 501 is configured to receive an update request, where the update request is used to instruct to modify or remove a target PFD, and the target PFD is associated with a target application identifier. The sending module 502 is configured to send, specific to a session for which a first policy rule including the target application identifier is installed or activated, first indication information or second indication information to a control function network element if the enforcement function network element has detected data about an application corresponding to the target application identifier using the target PFD and the enforcement function network element has reported start indication information of the application to the control function network element. The first indication information is stop indication information of the application, and the second indication information is indication information that the target PFD has been removed or modified.

Optionally, the enforcement function network element 50 further includes the processing module 503, where the processing module is configured to: after the receiving module receives the update request, specific to the session for which the first policy rule including the target application identifier is installed or activated, determine that the data about the application corresponding to the target application identifier has been detected using the target PFD, and that the start indication information of the application has been reported to the control function network element.

Optionally, the sending module 502 is configured to send, specific to the session for which the first policy rule including the target application identifier is installed or activated, the first indication information or the second indication information to the control function network element if the enforcement function network element has detected the data about the application corresponding to the target application identifier using the target PFD, and has reported the start indication information of the application to the control function network element, and the target PFD is a last PFD that is used to detect the data about the application among a PFD associated with the target application identifier.

Optionally, the sending module 502 is configured to send, specific to the session for which the first policy rule including the target application identifier is installed or activated, the first indication information or the second indication information to the control function network element if the enforcement function network element has detected the data about the application corresponding to the target application identifier using the target PFD, and has reported the start indication information of the application to the control function network element, and the target PFD is a last PFD associated with the target application identifier or the target PFD is a last PFD that is associated with the target application identifier and that is provided by a packet flow description function network element.

Optionally, the processing module 503 is further configured to: before the receiving module 501 receives the update request, detect the data about the application using the PFD associated with the target application identifier; establish a correspondence between the detected data about the application and the used PFD; and after the receiving module 501 receives the update request, determine, based on the correspondence and the target PFD, whether there is data about the application corresponding to the target PFD. If there is data about the application corresponding to the target PFD, the processing module 503 is configured to determine that the data about the application corresponding to the target application identifier has been detected using the target PFD.

Optionally, if the start indication information of the application includes an application start indication and the application identifier, the first indication information includes an application stop indication and the application identifier, and the second indication information includes the application identifier and the indication information that the target PFD has been removed or modified.

Optionally, if the start indication information of the application includes an application start indication, the application identifier, service data flow description information, and a corresponding instance identifier, the first indication information includes an application stop indication, the application identifier, and the instance identifier, and the second indication information includes the application identifier, the indication information that the target PFD has been removed or modified, and the instance identifier.

Optionally, the processing module 503 is further configured such that after the receiving module 501 receives the update request, the processing module 503 stops enforcing the first policy rule for the data about the application that is detected using the target PFD.

Optionally, the receiving module 501 is further configured to receive a second policy rule sent by the control function network element, where the second policy rule is used to control subsequent data about the application.

Optionally, when the enforcement function network element is a policy and charging enforcement function network element, the control function network element is a policy and rule function network element; or when the enforcement function network element is a traffic detection function user-plane function network element, the control function network element is a traffic detection function control-plane function network element; or when the enforcement function network element is a packet data network gateway user-plane function network element, the control function network element is a packet data network gateway control-plane function network element; or when the enforcement function network element is a user-plane function network element, the control function network element is a session management function network element.

Optionally, the receiving module 501 is further configured such that when the enforcement function network element is a policy and charging enforcement function network element and the control function network element is a policy and rule function network element, the receiving module 501 receives a third policy rule sent by the control function network element. Additionally, the processing module 503 is further configured to perform, according to the third policy rule, policy control on the application corresponding to the target application identifier. The receiving module 501 is further configured to receive removal instruction information sent by the control function network element for the third policy rule, and the processing module 503 is further configured to remove the third policy rule.

Optionally, the receiving module 501 is further configured such that when the enforcement function network element is a packet data network gateway user-plane function network element and the control function network element is a packet data network gateway control-plane function network element, or when the enforcement function network element is a user-plane function network element and the control function network element is a session management function network element, the receiving module 501 receives a fourth policy rule and one or more other rules associated with the fourth policy rule that are sent by the control function network element. The processing module 503 is further configured to perform, according to the fourth policy rule and the associated one or more other rules, policy control on the application corresponding to the target application identifier. The receiving module 501 is further configured to receive removal instruction information sent by the control function network element for the fourth policy rule and the one or more other rules associated with the fourth policy rule, and the processing module 503 is further configured to remove the fourth policy rule and the one or more other rules associated with the fourth policy rule.

Figure 10:
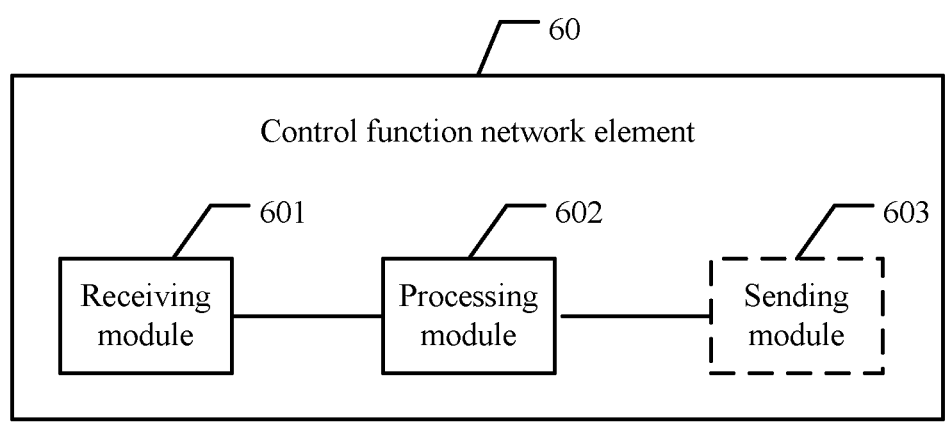
FIG. 10 is a schematic diagram of a control function network element according to an embodiment of this application.

FIG. 10 is a schematic structural diagram of a control function network element 60.

As shown in FIG. 10, a control function network element provided in this embodiment of this application includes a receiving module 601, a processing module 602, and a sending module 603. The receiving module 601 is configured to receive indication information that a target PFD has been removed or modified and that is sent by an enforcement function network element, where the target PFD is associated with a target application identifier. The indication information is used to indicate that the enforcement function network element has detected data about an application corresponding to the target application identifier using the target PFD, indicate that the enforcement function network element has reported start indication information of the application to the control function network element, and indicate that the target PFD has been modified or removed. The processing module 602 is configured to adjust a first policy rule based on the indication information that the target PFD has been removed or modified.

Optionally, the processing module 602 is configured to determine, based on the indication information that the target PFD has been removed or modified, a second policy rule used by the enforcement function network element to control subsequent data about the application. The sending module 603 is configured to send the second policy rule to the enforcement function network element.

Optionally, the processing module 602 is further configured such that when the enforcement function network element is a policy and charging enforcement function network element and the control function network element is a policy and rule function network element, the processing module 602 determines a third policy rule based on the start indication information. The sending module 603 is further configured to: send the third policy rule to the enforcement function network element; and send removal instruction information for the third policy rule to the enforcement function network element, to instruct the enforcement function network element to remove the third policy rule.

Optionally, the processing module 602 is further configured such that when the enforcement function network element is a traffic detection function network element and the control function network element is a policy and rule function network element, the processing module 602 determines a third policy rule based on the start indication information. Additionally, the sending module 603 is further configured to send removal instruction information for the third policy rule to the charging enforcement function network element, to instruct the policy and charging enforcement function network element to remove the third policy rule.

Optionally, the processing module 602 is further configured such that when the enforcement function network element is a packet data network gateway user-plane function network element and the control function network element is a packet data network gateway control-plane function network element, or when the enforcement function network element is a user-plane function network element and the control function network element is a session management function network element, the processing module 602 determines, based on the start indication information, a fourth policy rule and one or more other rules associated with the fourth policy rule. Additionally, the sending module 603 is further configured to: send the fourth policy rule and the one or more other rules associated with the fourth policy rule to the enforcement function network element; and send removal instruction information for the fourth policy rule and the one or more other rules associated with the fourth policy rule to the enforcement function network element, to instruct the enforcement function network element to remove the fourth policy rule and the one or more other rules associated with the fourth policy rule.

All related content of each step in the foregoing method embodiments may be cited in function descriptions of a corresponding function module. Details are not described herein again.

In this embodiment, the enforcement function network element 50 is presented with the function modules implemented through integration. The "module" herein may be an application-specific integrated circuit (ASIC), a circuit, a processor and a memory that execute one or more software programs or firmware programs, an integrated logic circuit, and/or another component that can provide the foregoing function. In an embodiment, a person skilled in the art may figure out that the enforcement function network element 50 may be in a form shown in FIG. 8.

For example, the processor 401 in FIG. 8 may invoke the computer executable instruction stored in the memory 403, such that the enforcement function network element 50 performs the policy control methods in the foregoing method embodiments.

In some implementations, functions/implementation processes of the receiving module 501, the processing module 503, and the sending module 502 in FIG. 9, and the receiving module 601, the processing module 602, and the sending module 603 in FIG. 10 may be implemented by the processor 401 in FIG. 8 by invoking the computer executable instruction stored in the memory 403. Alternatively, functions/implementation processes of the processing module 503 in FIG. 9 and the processing module 602 in FIG. 10 may be implemented by the processor 401 in FIG. 8 by invoking the computer executable instruction stored in the memory 403; and functions/implementation processes of the receiving module 501 and the sending module 502 in FIG. 9, and the receiving module 601 and the sending module 603 in FIG. 10 may be implemented by the communications interface 404 in FIG. 8.

The enforcement function network element and control function network element provided in this embodiment of this application may be configured to perform the foregoing policy control methods. Therefore, for technical effects that can be achieved by the network elements, refer to the foregoing method embodiments. Details are not described herein again.

In the foregoing embodiments, the enforcement function network element 50 and the control function network element 60 are presented with the function modules implemented through integration. Certainly, in this embodiment of this application, each function module of the enforcement function network element and the control function network element may be alternatively implemented in correspondence to each function. This is not specifically limited in this embodiment of this application.

Optionally, an embodiment of this application provides a chip system. The chip system includes a processor configured to support a user-plane function entity in implementing the foregoing policy control method. In a possible design, the chip system further includes a memory, and the memory is configured to store a program instruction and data that are necessary for the enforcement function network element or the control function network element. The chip system may include a chip, or may include a chip and one or more other discrete devices. This is not specifically limited in this embodiment of this application.

All or some of the foregoing embodiments may be implemented using software, hardware, firmware, or any combination thereof. When software is used to implement the embodiments, the embodiments may be implemented completely or partially in a form of a computer program product.

The computer program product includes one or more computer instructions. When the computer program instruction is loaded and executed on a computer, the procedure or functions according to the embodiments of this application are all or partially generated. The computer may be a general-purpose computer, a dedicated computer, a computer network, or another programmable apparatus. The computer instruction may be stored in a computer-readable storage medium or may be transmitted from one computer-readable storage medium to another computer-readable storage medium. For example, the computer instruction may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be accessed by a computer, or may be a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk (SSD)), or the like.

A person of ordinary skill in the art may understand that all or some of the steps of the methods in the embodiments may be completed by a program instructing related hardware. The program may be stored in a computer-readable storage medium. The storage medium may include a ROM, a RAM, a magnetic disk, an optical disc, and the like.

The foregoing describes in detail the policy control method, the network element, and the system that are provided in the embodiments of this application. The principle and implementations of this application are described in this specification through various examples. The descriptions about the embodiments are merely provided to help understand the methods and core ideas of this application. In addition, a person of ordinary skill in the art can make variations to the implementations and application scopes according to the ideas of this application. In summary, the content of this specification shall not be construed as any limitation to this application.

What is claimed is:

1. A policy control method, the method comprising:
   receiving, by an enforcement function network element in a communication system, an update request to modify or remove a target packet flow description (PFD) associated with a target application identifier;
   making, by the enforcement function network element and for a session for which a first policy rule comprising the target application identifier is installed or activated, a determination that data about an application corresponding to the target application identifier has been detected using the target PFD and that start indication information of the application has been reported to a control function network element;
   sending, by the enforcement function network element, stop indication information of the application to the control function network element; and
   receiving, by the control function network element, the stop indication information of the application.

2. The policy control method of claim 1, further comprising determining, by the enforcement function network element, that the target PFD is a last PFD that detects the data about the application among PFDs associated with the target application identifier.

3. The policy control method of claim 1, further comprising: determining, by the enforcement function network element, that the target PFD is a last PFD associated with the target application identifier; or determining, by the enforcement function network element, that the target PFD is a last PFD that is associated with the target application identifier and that is provided by a packet flow description function network element.

4. The policy control method of claim 1, wherein prior to receiving the update request, the policy control method further comprises: detecting, by the enforcement function network element, the data about the application using PFDs associated with the target application identifier; and establishing an association between the data about the application and the PFDs associated with the target application identifier, wherein after receiving the update request, the policy control method further comprises: determining, by the enforcement function network element based on the association and the target PFD, whether there is target PFD data about the application corresponding to the target PFD; and determining that the data about the application corresponding to the target application identifier has been detected using the target PFD when the enforcement function network element determines that there is the target PFD data about the application corresponding to the target PFD.

5. The policy control method of claim 1, wherein the stop indication information of the application comprises an application stop indication and the target application identifier when the start indication information of the application comprises an application start indication and the target application identifier.

6. The policy control method of claim 1, wherein the stop indication information of the application comprises an application stop indication, the target application identifier, and an instance identifier when the start indication information of the application comprises an application start indication, the target application identifier, service data flow description information, and a corresponding instance identifier.

7. The policy control method of claim 1, wherein after receiving the update request, the policy control method further comprises stopping, by the enforcement function network element, enforcing the first policy rule for the data about the application that is detected using the target PFD.

8. The policy control method of claim 1, further comprising receiving, by the enforcement function network element, a second policy rule from the control function network element, wherein the second policy rule controls subsequent data of the application.

9. The policy control method of claim 1, wherein the control function network element is: a policy and charging rule function network element when the enforcement function network element is a policy and charging enforcement function or a traffic detection function network element; a packet data network gateway control-plane function network element when the enforcement function network element is a packet data network gateway user-plane function network element; a traffic detection function control plane function network element when the enforcement function network element is a traffic detection function user-plane function network element; and a session management function network element when the enforcement function network element is a user-plane function network element.

10. An enforcement function network element in a communication system comprising a control function network element formulating a policy rule to be enforced by the enforcement function network element, comprising:
   a memory configured to store instructions; and
   a processor coupled to the memory and configured to execute the instructions to:
   receive an update request to modify or remove a target packet flow description (PFD) associated with a target application identifier;
   determine, for a session for which a first policy rule comprising the target application identifier is installed or activated, that data about an application corresponding to the target application identifier has been detected using the target PFD and that start indication information of the application has been reported to the control function network element; and send stop indication information of the application to the control function network element.

11. The enforcement function network element of claim 10, wherein the processor is further configured to execute the instructions to determine that the target PFD is a last PFD that detects the data about the application among PFDs associated with the target application identifier.

12. The enforcement function network element of claim 10, wherein, prior to receiving the update request, the processor is configured to execute the instructions to: detect the data about the application using the PFD associated with the target application identifier; establish an association between the detected data about the application and the used PFD; determine, after receiving the update request, based on the association and the target PFD, whether there is data about the application corresponding to the target PFD; and determine that the data about the application corresponding to the target application identifier has been detected using the target PFD when the processor determines that there is data about the application corresponding to the target PFD.

13. The enforcement function network element of claim 10, wherein the stop indication information of the application comprises an application stop indication and the target application identifier when the start indication information of the application comprises an application start indication and the target application identifier.

14. The enforcement function network element of claim 10, wherein the stop indication information of the application comprises an application stop indication, the target application identifier, and an instance identifier when the start indication information of the application comprises an application start indication, the target application identifier, service data flow description information, and a corresponding instance identifier.

15. A policy control system comprising:
a control function network element; and
an enforcement function network element stored in a memory, and configured to:
receive an update request to modify or remove a target packet flow description (PFD) associated with a target application identifier;
for a session for which a first policy rule comprising the target application identifier is installed or activated, determine that data about an application corresponding to the target application identifier has been detected using the target PFD and that start indication information of the application has been reported to the control function network element; and
send stop indication information of the application to the control function network element, wherein the control function network element is configured to: receive the stop indication information from the enforcement function network element; and adjust the first policy rule based on the stop indication information.

16. The system of claim 15, wherein the enforcement function network element is further configured to determine that the target PFD is a last PFD that detects the data about the application among PFDs associated with the target application identifier.

17. The system of claim 15, wherein the enforcement function network element is further configured to: determine that the target PFD is a last PFD associated with the target application identifier; or determine that the target PFD is a last PFD that is associated with the target application identifier and that is provided by a packet flow description function network element.

18. The system of claim 15, wherein the stop indication information of the application comprises an application stop indication and the target application identifier when the start indication information of the application comprises an application start indication and the target application identifier.

19. The system of claim 15, wherein the stop indication information of the application comprises an application stop indication, the target application identifier, and an instance identifier when the start indication information of the application comprises an application start indication, the target application identifier, service data flow description information, and a corresponding instance identifier.

20. The system of claim 15, wherein the control function network element is: a policy and charging rule function network element when the enforcement function network element is a policy and charging enforcement function or a traffic detection function network element; a packet data network gateway control-plane function network element when the enforcement function network element is a packet data network gateway user-plane function network element; when the enforcement function network element is a traffic detection function user-plane function network element, the control function network element is a traffic detection function control plane function network element; and a session management function network element when the enforcement function network element is a user-plane function network element.

* * * * *